US 9,342,233 B1

United States Patent
Dimson et al.

(10) Patent No.: US 9,342,233 B1
(45) Date of Patent: May 17, 2016

(54) DYNAMIC DICTIONARY BASED ON CONTEXT

(75) Inventors: Thomas F. Dimson, Seattle, WA (US); Joshua M. Goodspeed, Seattle, WA (US); Tom Killalea, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 13/452,305

(22) Filed: Apr. 20, 2012

(51) Int. Cl.
 *G06F 3/048* (2013.01)
 *G06F 3/0488* (2013.01)
 *G06F 17/27* (2006.01)

(52) U.S. Cl.
 CPC .......... *G06F 3/0488* (2013.01); *G06F 17/2735* (2013.01)

(58) Field of Classification Search
 CPC ............ G06F 17/2735; G06F 17/2785; G06F 17/2795; G06F 17/28; G06F 3/0237; G06F 17/24; G06F 17/27; G06F 17/275; G06F 3/04883; G06F 3/0488; G06F 3/0481; G06F 3/0482; G06F 3/0484; G06F 3/04886; G06F 17/241; G06F 17/276; G06F 17/289; G06F 17/30011; G06F 17/3064; G06F 17/30864
 USPC ...................................................... 704/9–10
 See application file for complete search history.

(56) References Cited

U.S. PATENT DOCUMENTS

| | | | |
|---|---|---|---|
| 6,785,869 B1* | 8/2004 | Berstis | 715/210 |
| 2004/0102956 A1* | 5/2004 | Levin | 704/2 |
| 2006/0156222 A1* | 7/2006 | Chi et al. | 715/512 |
| 2006/0173818 A1* | 8/2006 | Berstis | G06F 17/30864 |
| 2008/0141182 A1* | 6/2008 | Barsness et al. | 715/864 |
| 2008/0154582 A1* | 6/2008 | Bruecken | 704/10 |
| 2011/0161073 A1* | 6/2011 | Lesher et al. | 704/10 |
| 2011/0251837 A1* | 10/2011 | Conboy et al. | 704/8 |
| 2011/0289115 A1* | 11/2011 | Schiller | G06F 17/30663 707/770 |
| 2012/0150533 A1* | 6/2012 | O'Neill | 704/9 |
| 2012/0179448 A1* | 7/2012 | Gupta | H04W 4/028 704/2 |

* cited by examiner

*Primary Examiner* — Claudia Dragoescu
(74) *Attorney, Agent, or Firm* — Lee & Hayes, PLLC

(57) ABSTRACT

In some implementations, a user of an electronic device may select a term of one or more words from the text of a displayed digital work. In response, a dictionary module may select a particular dictionary to access from among a plurality of dictionaries available on the electronic device. For example, based at least in part on metadata corresponding to the displayed digital work, the dictionary module may select a dictionary to access from a hierarchy of dictionaries. The dictionary module may present a definition obtained from the selected dictionary in a dictionary interface displayed over the presentation of the digital work. Further, the dictionary module may identify a location of at least one other occurrence of the selected term in the digital work or in a different digital work, and may display an excerpt of text including the at least one other occurrence of the selected term.

31 Claims, 16 Drawing Sheets

DYNAMIC DICTIONARY BASED ON CONTEXT

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences and gaining knowledge while consuming these works. For example, the experience of consuming such works may be enhanced with the provision of access to appropriate and relevant reference material.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
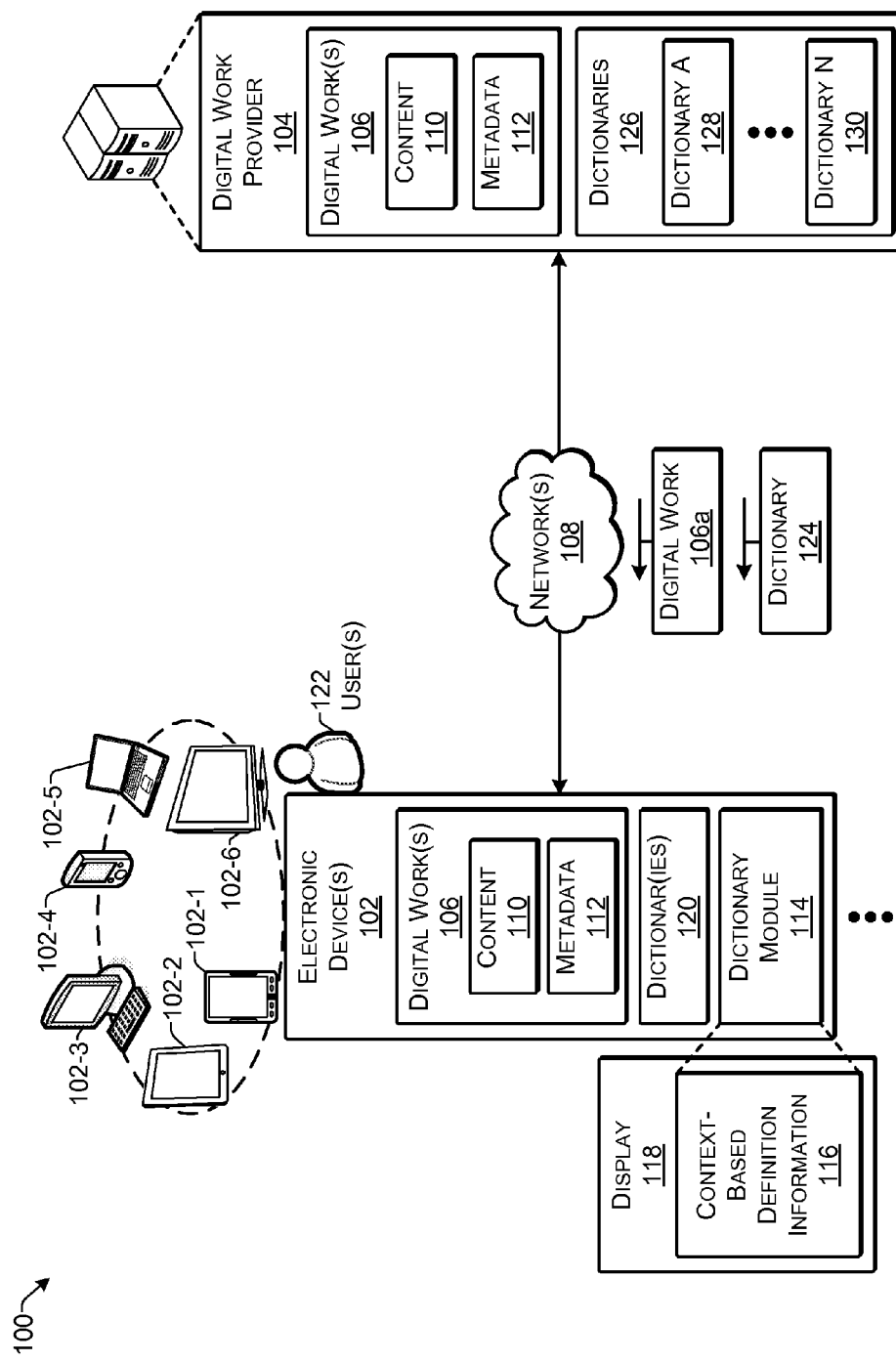
FIG. 1 illustrates an example system architecture for a dynamic dictionary to provide context-based definition information according to some implementations.

This disclosure includes techniques and arrangements for providing a dictionary in connection with a digital work, such as a digital work that includes textual content or that has textual content associated therewith. For example, the text of a digital work may be displayed on a display by an electronic device. A user of the electronic device may select a term from the displayed text of the digital work. For example, a term may be a word, a compound word, a phrase of one or more words, or the like. In response, some implementations herein may present a dictionary interface that provides definition information for the selected term. For instance, a dictionary module on the electronic device may dynamically access at least one dictionary to determine an appropriate definition, description, or the like, to display based at least in part on a context determined for the currently displayed text. For example, the at least one dictionary may include any of various types of references and/or reference information that provide a definition, description, synonym, or other information related to the selected term. Examples of dictionaries herein may include word dictionaries, lexicons, foreign language dictionaries, geographic dictionaries, technical dictionaries, specialty dictionaries, encyclopedias, thesauruses, almanacs, atlases, biographies, glossaries, factbooks, and various other references or information sources.

Further, the dictionary module may select one or more excerpts of text that provide one or more examples of use of the selected term. For instance, the dictionary module may select the excerpts from locations of other occurrences of the selected term in the text of the currently displayed digital work, and/or from occurrences of the selected term in one or more other digital works that may be included in the user's library.

As an example, suppose that a user of an electronic device is reading the text of a digital work presented on the display of the electronic device and encounters a term that the user does not recognize. The user may select the term to initiate display of a dictionary interface, such as overlaid on top of the presentation of the digital work. A dictionary module on the electronic device of may present the dictionary interface, and may further determine a suitable definition to display for the selected term. When determining a suitable definition to display for the selected term, the dictionary module may access metadata associated with the currently displayed digital work. For instance, the metadata may indicate a type or category of the digital work such as whether the digital work is a work of fiction, a textbook, a reference book, a self-help book, a biography, a history book, a cookbook, and so forth. Further, the categories may further be broken down into subcategories, e.g., fiction may be any of romance novels, science fiction novels, mystery novels, fantasy novels, short stories, historical fiction, children's books, and so forth. Accordingly, based on an identified category and/or subcategory, the dictionary module may access a particular dictionary of a plurality of available dictionaries to attempt to locate a definition for the selected term.

For example, suppose that the selected term is "argon." If the digital work is a chemistry book, the dictionary module may determine this from metadata associated with the digital work and access a chemical dictionary to obtain a highly technical definition for the selected term. On the other hand, if the digital work is a work of fiction or other non-technical work, the dictionary module may instead access a more general dictionary to obtain a less technical definition for argon. Furthermore, if the digital work is a history book on the Mongolian Empire, the dictionary module may access a dictionary on historical terms to identify "argon" as a former ruler of a portion of the Mongolian Empire.

In some examples, the electronic device may include a plurality of dictionaries that can be accessed according to a hierarchy. For instance, in the case that the book is a chemistry book, the dictionary module may first access a chemical dictionary to attempt to locate a definition for a selected term. If the definition for the term is not located in the chemical dictionary, the dictionary module may next access a more general technical dictionary to attempt locate a definition. If the definition for the term is still not located, the dictionary module may next access a general dictionary or other dictionary that is next in the hierarchy.

Similarly, in the case that a selected term is in a foreign language, the dictionary module may first access a foreign dictionary corresponding to the language of the selected term to attempt to locate a definition prior to attempting to locate a definition from a general dictionary. For example, in the case that the digital work is in a particular foreign language, the dictionary module may determine the language of the digital work, such as from metadata associated with the digital work, and may then access the corresponding foreign language dictionary to attempt to locate a definition for the selected term, rather than accessing a standard dictionary. Furthermore, in the case of a digital work that contains mixed languages, such as two or more different languages, the dictionary module may identify a language for a selected term in the digital work and may access a dictionary corresponding to the identified language for the selected term.

Additionally, in situations in which a language includes different dialects, conventions, vernaculars, or spellings, an appropriate dictionary may by selected for the particular dialect, convention, etc. For instance, the dictionary module may recognize or may determine from metadata whether a digital work is written in American English, British English, Australian English, and so forth, and may select a corresponding different dictionary based on this determination. For example, when a particular digital work is written by a British author, a British-English version of a dictionary may be accessed first in a hierarchy, rather than an American-English version of a dictionary to take into account differences in spelling of various words (such as "colour" rather than "color") the use of different words for various things (such as "lift" rather than "elevator"), and so forth. Accordingly, implementations herein attempt to locate the most relevant definition for a selected term by accessing at least one dictionary of a plurality of dictionaries based on information about the digital work from which the term is selected.

In some cases, the electronic device may initially receive or may include at least a general dictionary for the user's country. As digital works of various types or categories are received by the electronic device, one or more additional dictionaries corresponding to the categories of digital works received may be provided to or made available to the electronic device. For example, if the user is in the USA, the user may initially receive an American-English dictionary. Subsequently, if the user obtains a digital work in the French language, the digital work provider may include or make available to the user a French language dictionary. In some cases, the French language dictionary may be bundled with the French language digital work, or may be made available as a separate download that can be accessed or obtained by the user of the electronic device. Alternatively, the electronic device may be preloaded with, or may be provided with access to, a plurality of dictionaries of different types or focuses, such as for various different categories of digital works, various different languages, various different technical fields, and so forth.

Furthermore, each digital work may have associated metadata that is provided to the electronic device with the digital work. The metadata may include an identification of a category of the digital work and/or may identify a suitable dictionary for use with the digital work. The metadata may further identify parts of speech contained in the digital work. Thus, for term selected from the digital work, the metadata may identify the part of speech to which the selected term corresponds. For example, the metadata may identify the selected term as a particular part of speech such as a noun, verb, adverb, adjective, pronoun, interjection, preposition, conjunction, and so forth. Accordingly, the dictionary module may select a definition corresponding to the identified part of speech. Thus, if a selected term is identified as a noun by the metadata, the dictionary module may select a definition that corresponds to a noun, rather than a definition for a different part of speech, such as a verb. In addition, when selecting an excerpt of text for another occurrence of the selected term, the dictionary module may also check that the other occurrence is the same part of speech type as the selected term. Thus, an example of usage may be provided that employs the term as the same part of speech as in the selected term. Additionally, in some examples, rather than determining the part of speech of the selected term from metadata associated with the digital work, the dictionary module may identify the part of speech for the selected term on the fly in response to the selection of the term by the user.

Furthermore, in some examples, crowd-sourced information may be used to provide definition information for particular terms in a digital work, such as for correcting a selected definition or in the case that a definition cannot be determined. For example, a community of users may be afforded the opportunity to correct or augment the context based definition information. These types of contributions to the knowledge base for a particular digital work may be vetted by the community or by employees of the digital work provider. Further, in some cases, the digital work provider may solicit community participation, and may aggregate results to determine suitable definition information for particular terms selected from particular digital works.

For discussion purposes, some example implementations are described in the environment of providing definition information based on content of one or more digital works. However, the implementations herein are not limited to the particular examples provided, and may be extended to other types of information and other interface configurations, as will be apparent to those of skill in the art in light of the disclosure herein.

Example Architecture

FIG. 1 illustrates an example architecture of a system 100 for providing a dictionary in connection with a digital work according to some implementations. In some instances, the dictionary may be implemented on one or more electronic devices 102 capable of displaying digital text. Some examples of the electronic devices 102 may include digital media devices and eBook readers 102-1, tablet computing devices 102-2, desktop, terminal and workstation computing devices 102-3, smart phones and mobile devices 102-4, laptop and netbook computing devices 102-5, televisions, gaming systems and home electronic devices 102-6, and any other device capable of accessing and rendering digital works, online content, mobile content, textual content, or the like.

In the illustrated example, the electronic device 102 may communicate with a computing device of a digital work provider 104 to access or receive at least one digital work 106 over one or more networks 108. For example, the network(s) 108 may include a local area network (LAN), a wide area network (WAN), such as the Internet, or any combination thereof, and may include both wired and wireless communication technologies using any suitable protocols and communication techniques. The digital work provider 104 and the electronic device 102 may communicate and interact with one another using any combination of suitable communication and networking protocols, such as Internet protocol (IP), transmission control protocol (TCP), hypertext transfer protocol (HTTP), and so forth. In some cases, the electronic device 102 may download the digital work 106, while in other cases the digital work 106 may be streamed to the electronic device 102.

The digital work provider 104 may maintain an online location, such as a merchant website, an e-commerce site, or other functionality that offers one or more digital works 106 to the public. Alternatively, the digital work provider 104 may provide the digital work 106 or make the digital work 106 available to one or more electronic devices 102 through online or mobile applications (not shown in FIG. 1) executing on the electronic devices 102.

In some implementations, the digital work 106 may be or may include an electronic book (eBook) having one or more pages of text. For example, the device 102 may be able to display the text of the eBook and also any illustrations, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, web documents, plays, screen plays, closed captioning transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and multi-media content, that may have text associated therewith, or from which text or terms may be derived, such as from lyrics, screen plays, closed captioning transcripts, speech recognition, and so forth.

Each digital work 106 may include content 110, such as text, and may further include metadata 112 that is associated with the digital work content 110. For example, the digital work provider 104, the author, the publisher, etc., may provide or may generate metadata 112 for a corresponding digital work 106. The digital work 106 may be made up of any number of files or may be a single file. For example, the content 110 may be stored on the electronic device 102 as one or more separate files from one or more separate files including the metadata 112. Alternatively, however, in other examples, the content 110 and the metadata 112 may be stored as a single file.

In some examples, the digital work provider 104 may generate the metadata 112 for a respective digital work 106 to provide information related to the content 110 of the digital work 106. For instance, the digital work provider 104 may receive the digital work 106, such as from the publisher, author, or other source, and may process the content 110 of digital work 106 to make the digital work 106 compatible with various display formats, device platforms, and so forth.

The digital work provider 104 may further parse and analyze the content 110 of the digital work 106 to produce the metadata 112 that corresponds to the digital work 106. For example, the metadata 112 may include a variety of information, such as a language in which the content is written, and a topic, subject, or category of the digital work 106. The metadata 112 may further identify all the parts of speech contained in the content and the location of each part of speech contained in the content. For example, the digital work provider 104 may parse the content 110 into parts of speech, identify each part of speech, and associate a location in the digital work with each part of speech. The parts of speech information and the location information may be included with the metadata 112. Thus, as described additionally below, each term of one word or more in the digital work may be assigned a specific location, and the location information may be used to identify the location of each occurrence of the term in the digital work 106. Additionally, in some cases, an index of the terms in the digital work 106 may be generated so that every occurrence of each term of one or more words in the digital work 106 may be quickly located based on the associated location information. The metadata 112 may further identify the locations of individual sentences, paragraphs, chapters, and so forth in the digital work.

The electronic device 102 may include a dictionary module 114. For example, the dictionary module 114 may come preloaded on the electronic device 102, or may be received over the network 108 from the digital work provider 104. The dictionary module 114 may be a stand-alone application, or may be one or more modules of another application, an operating system, a reader application, a digital-work-player application, or any other computer program or software able to be executed by the electronic device 102. Thus, in some examples, the user may activate the dictionary module 114 independently as a distinct application, while in other examples, the user may activate the dictionary module 114 from within another application, such as while reading, viewing, or playing a digital work.

The dictionary module 114 may generate context-based definition information 116 for presentation on a display 118 associated with the electronic device 102. The context-based definition information 116 may be based at least in part on information contained in, derived from, or associated with at least one digital work 106. For instance, in response to a user selection of a term in a particular digital work 106, the dictionary module 114 may access the metadata 112 for the particular digital work 106 to obtain information related to the particular digital work 106 to use for generating the context-based definition information 116.

When generating the context-based definition information 116, the dictionary module 114 may further access one or more dictionaries 120 maintained on the electronic device 102. As one example, the electronic device 102 may maintain multiple dictionaries 120 and the dictionary module 114 may access one or more of the multiple dictionaries 120 based at least in part on a hierarchy of the dictionaries for the particular digital work 106. For instance, as mentioned above, if the digital work is a technical work of nonfiction, the hierarchy may indicate that the dictionary module 114 first accesses a technical dictionary to attempt to locate a definition before accessing a more general dictionary. Thus, in some cases, the electronic device 102 may have access to numerous different types or categories of dictionaries 120 corresponding to a plurality of different types or categories of digital works 106 maintained on, or accessible by, the electronic device 102.

As one illustrative example, suppose that the digital work 106 is an eBook, and that the user 122 is reading the digital work 106 on the electronic device 102. While reading the digital work 106, the user 122 encounters a term for which the user desires to obtain a definition. The user may make a user input or may otherwise select the term to initiate the dictionary module 114 for dynamically generating context-based definition information 116 related to the selected term. For instance, the dictionary module 114 may access the metadata 112 for the digital work 106 that the user 122 is currently reading to obtain information for generating the context-based definition information 116. In some cases, the context-based definition information 116 may include one or more examples of usage drawn from the currently displayed digital work or from other digital works in the user's library. The dictionary module 114 may further access one or more dictionaries 120 based at least in part on the metadata 112 to obtain a context-based definition for the selected term. For instance, the metadata may indicate a category or subcategory of the digital work and the dictionary module 114 may first access a dictionary corresponding to that category or subcategory to attempt to locate a definition for the selected term.

The dictionary module 114 may display the context-based definition information 116 in a pop-up or overlay displayed overtop of the presentation of the digital work 106. Alternatively, the context-based definition information 116 may be displayed in a partial window or preview window located over a portion of the presentation of the digital work 106. Still alternatively, the context-based definition information 116 may be displayed in a separate full-screen window or interface, and the presentation of the digital work 106 may be closed or otherwise not viewable.

As another variation, rather than initiating the dictionary module 114 from within an application or program that is displaying the digital work 106, the user 122 may initiate the dictionary interface by activating the dictionary module 114 as a separate application on the electronic device 102. For example, the user may enter a term into a dictionary interface, and the dictionary module 114 may default to generating the context-based definition information 116 for the entered term from a most-recently-accessed digital work 106. Alternatively, the dictionary module 114 may present an interface to the user to enable the user to select one or more digital works from which the context-based definition information 116 is to be generated. Numerous other variations will be apparent to those of skill in the art in view of the disclosure herein.

When the user 122 of the electronic device 102 accesses, purchases or otherwise obtains a particular digital work 106a, such as through interaction with the digital work provider 104, the digital work provider 104 may make the particular digital work 106a, including the content 110 and the metadata 112, available for delivery to the electronic device 102. In some cases, the digital work provider 104 may also deliver, or make available for delivery, a dictionary 124 corresponding to the particular digital work 106a or corresponding to the category of the particular digital work 106a. For instance, the digital work provider 104 may track the dictionaries 120 already obtained by the electronic device 102, and may determine that the electronic device 102 does not include a particular dictionary corresponding to the category or language of the particular digital work 106a to be downloaded. As one example, if the particular digital work 106a being downloaded is a book on computer science, and the digital work provider 104 notes that the user 122 has not previously obtained a dictionary on computer science terms, the digital work provider 104 may include or make available a dictionary 124 of computer science terms with the particular digital work 106a on computer science.

In some situations, the particular digital work 106a and the corresponding dictionary 124 may be downloaded contemporaneously from the digital work provider 104, e.g., as a package or as a sequential download. Alternatively, the digital work 106a and the corresponding dictionary 124 may be provided to a third party, such as a wireless provider, that sends the digital work 106a and the dictionary 124 to the electronic device 102. Furthermore, if the user 122 subsequently obtains another a digital work on computer science, then because the electronic device 102 already includes the dictionary 124 on computer science terms, there is no need to download again the dictionary 124 on computer science terms.

Accordingly, the digital work provider 104 may maintain a plurality of dictionaries 126, such as dictionary A 128 through dictionary N 130, which may correspond to various types and categories of digital works, different languages, and so forth. The digital work provider 104 may make available an appropriate corresponding dictionary 126 to the electronic device 102 whenever the electronic device 102 acquires a digital work 106 in a category or language for which the electronic device 102 does not currently maintain a dictionary 120. Additionally, in some implementations, the digital work provider 104 may provide a digital work 106 and a corresponding dictionary 124, if not already received, to an intermediary, such as a wireless network provider (not shown), or the like, that, in turn, provides the digital work and corresponding dictionary to particular electronic device 102. For purposes of this disclosure, "providing" or "making available" by the digital work provider may include any intermediaries that perform delivery of the digital works and/or dictionaries.

Example Interfaces

Figure 2:
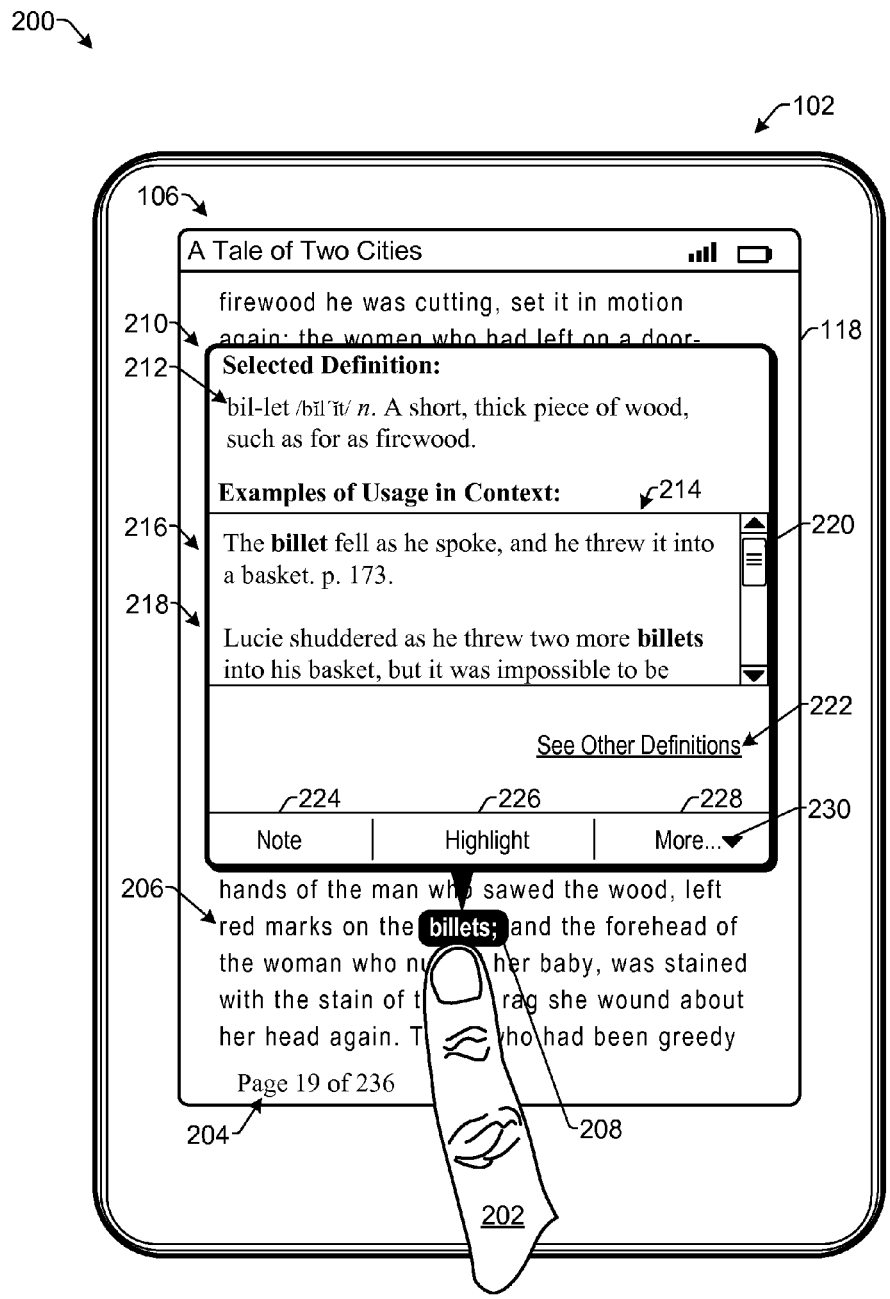
FIG. 2 illustrates an example dictionary interface for providing definition information according to some implementations.

FIG. 2 illustrates an example of a dictionary interface 200 that may be presented to the user on the electronic device 102 according to some implementations. In the example of FIG. 2, the electronic device 102 includes the display 118 for displaying the digital work 106 to the user. In some examples, the display 118 may be a touchscreen type of display configured with a sensor to sense a touch input received from an input effecter 202, such as a finger of a user, a stylus, or other pointer. Thus, the touchscreen may receive one or more touch inputs, interactions, selections of displayed objects, page swipes and so forth. In other examples, the display 118 may be non-touch sensitive. Accordingly, in addition to, or as an alternative to, a touch sensitive display, the electronic device 102 may include various external controls and input devices (not shown in FIG. 2). For example, some implementations of the electronic device 102 may include a virtual or physical keyboard, a mouse, a pointing stick, a touchpad, a trackball, a joystick, a remote control, buttons and/or various other controls for performing various desired inputs and interactions with the electronic device 102 and digital work 106 displayed on the display 118. Additionally, in some implementations, one or more voice commands may be used to control or interact with the digital works and interfaces herein, such as for selection of objects and performing other functions. Further, in some implementations, a user's eye position or point of focus may be detected to serve as inputs or commands. Thus, implementations herein are not limited to any type of input devices, techniques, or controls.

In this example, suppose that a digital work 106 that the user is currently reading is Charles Dickens' A Tale of Two Cities, and that the user has progressed to page 19 of 236 pages, as indicated by a page number 204 located at the bottom of a displayed page of text 206 presented on the display 118. Further, suppose that the user has encountered the term "billets" 208 on page 19, and desires to view the definition for this term 208. The user may select the term "billets" 208 from the displayed page of text 206, such as by touching the displayed term 208, tapping on the displayed term 208, or otherwise using an input action to select the term 208.

In response to the user selection of the term 208, the dictionary interface 200 may be displayed on the display 118. The dictionary interface 200 may include a pop-up window 210 presented on the display 118 that may include a selected definition 212 for the selected term 208. For example, the dictionary module 114 may locate the word in one or more dictionaries 120. In some cases, the dictionary module 114 may perform stemming to reducing the selected term 208 to its stem or root form. Thus, in some examples, the dictionary module 114 may include one or more stemming algorithms to identify a root word that may correspond to the selected term 208 when locating the definition for the selected term 208. For instance, the stemming algorithm may identify the word "billet" from the plural form "billets" in this example.

Furthermore, the window 210 may include an area 214 for providing one or more examples of usage of the term in context. The examples of usage may be drawn from the currently displayed digital work 106 or from other, different digital works, such as in the user's library or in the library of the digital work provider 104. In the illustrated example, a first example of usage 216 includes the selected term "billet" in the context of a sentence drawn from page 173 of the current digital work 106. A second example of usage 218 is only partially visible in this example, but the area 214 includes a slider or scroll bar 220 to enable the user to scroll down to view the remainder of the second example 218 and/or additional examples. In addition, if the user wishes to view other definitions for the selected term 208 as an alternative to the selected definition 212, the user may select a link 222 to see the other definitions.

The window 210 may further include other user-selectable options such as a note option 224 to add a note or annotation to the digital work 106 at the selected point; a highlight option 226 to add a highlight to the selected text, such as to enable the selected text to be more easily located in the future; and a "more" option 228 having a dropdown menu control 230. For example, the dropdown menu control 230 may be selected to view more choices for accessing a plurality of different types of information from within the digital work 106, such as for accessing network resources or websites, crowd-sourced information, online search engines, and so forth. Furthermore, while in this example, the dictionary interface 200 is a pop-up window displayed overtop of the presentation of the digital work 106, in other examples, the dictionary interface 200 may be displayed as a separate full-screen window, and further may be initiated from a separate application, rather than from within an application displaying the digital work 106.

In some examples, the dictionary interface 200, as well as the other user interfaces described herein, may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. A widget may run as a stand-alone application, i.e., is able to run outside of a web browser, and the runtime environment in which a widget is run may be referred to as a widget user agent. A widget user agent may be specifically enabled for running widgets, or a more generic user agent (e.g., a web browser or other application) may run a widget. See, e.g., W3C.org, Working Group Note 27 Sep. 2011 for additional description of widgets. The W3C is an international community that develops open standards for use on the World Wide Web. Further, widgets, HTML, JavaScript®, and CSS are just several examples of technologies for generating the dictionary interface 200 and the other interfaces described below, and numerous other possible techniques, tools, functionalities, programming technologies, and the like will be apparent to those of skill in the art in light of the disclosure herein.

Figure 3:
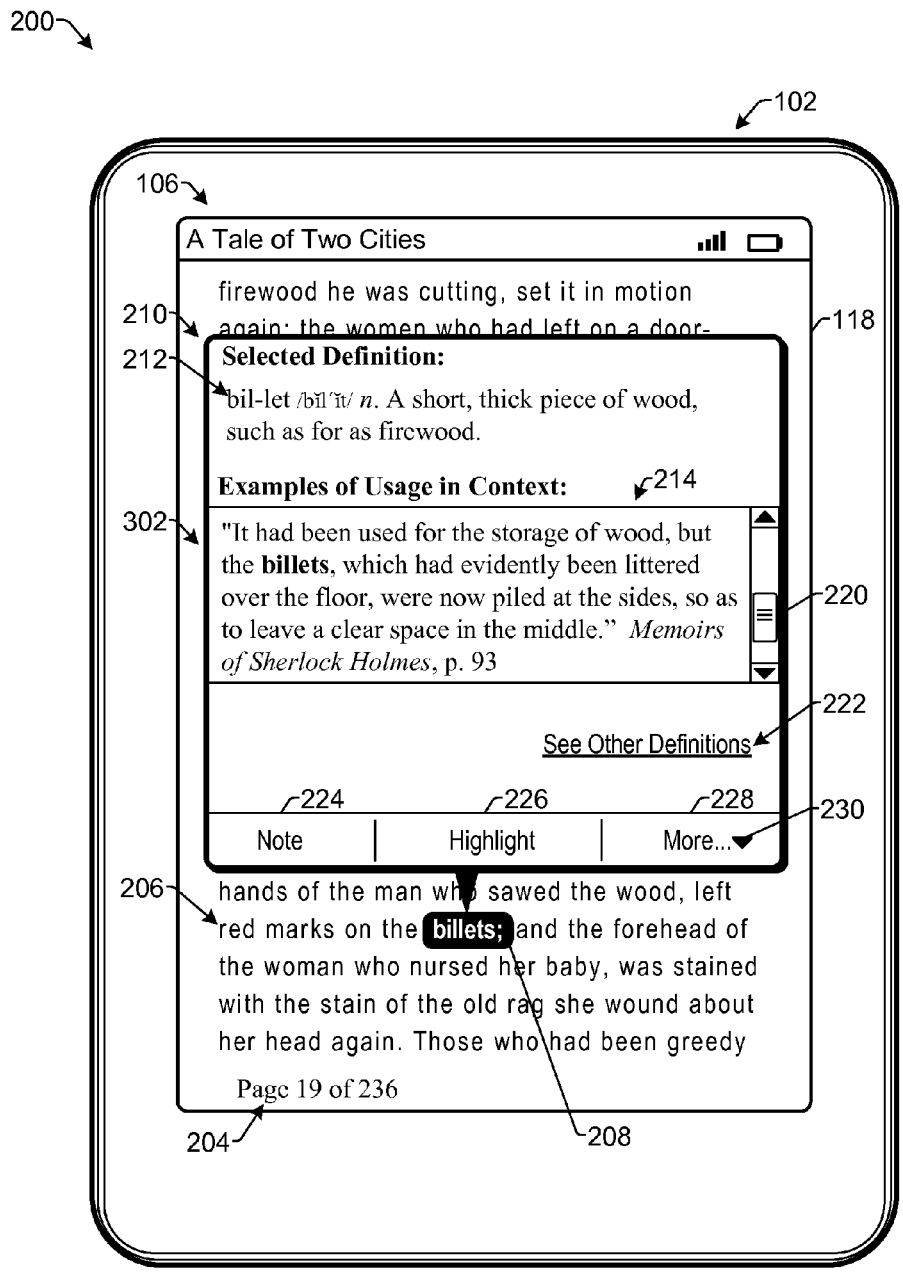
FIG. 3 illustrates an example dictionary interface for providing context-based definition information according to some implementations.

FIG. 3 further illustrates the example dictionary interface 200 of FIG. 2 according to some implementations herein. In this example, the suppose that the user elected to move the scroll bar 220 downward to view additional examples of usage in context in the area 214. In the example of FIG. 3, a third example of usage 302 is now visible and includes a sentence taken from a different digital work than the current digital work, namely, from page 93 of the *Memoirs of Sherlock Holmes*. Accordingly, the dictionary module 114 has located another digital work in the user's library that may also provide an example of context for the selected term 208.

Further, the *Memoirs of Sherlock Holmes* may also be categorized in the same category as *A Tale of Two Cities*, i.e., classic literature of the 19$^{th}$ Century, which further weighs in favor of using an excerpt from the *Memoirs of Sherlock Holmes* as an example of usage of the selected term 208 selected from *A Tale of Two Cities*. Thus, the dictionary module may take a number of factors into consideration when determining excerpts from other digital works to use as examples of usage for a selected term and for ranking the excerpts. These factors may include the language of a digital work, the category of the digital work, a time period during which the digital work was authored, whether the term is the same part of speech, and so forth. Furthermore, while several examples of dictionary interfaces have been described herein, numerous other dictionary interfaces, interface formats, and the like will be apparent to those of skill in the art having benefit of the disclosure herein.

Example Framework for Generating Definition Information

Figure 4:
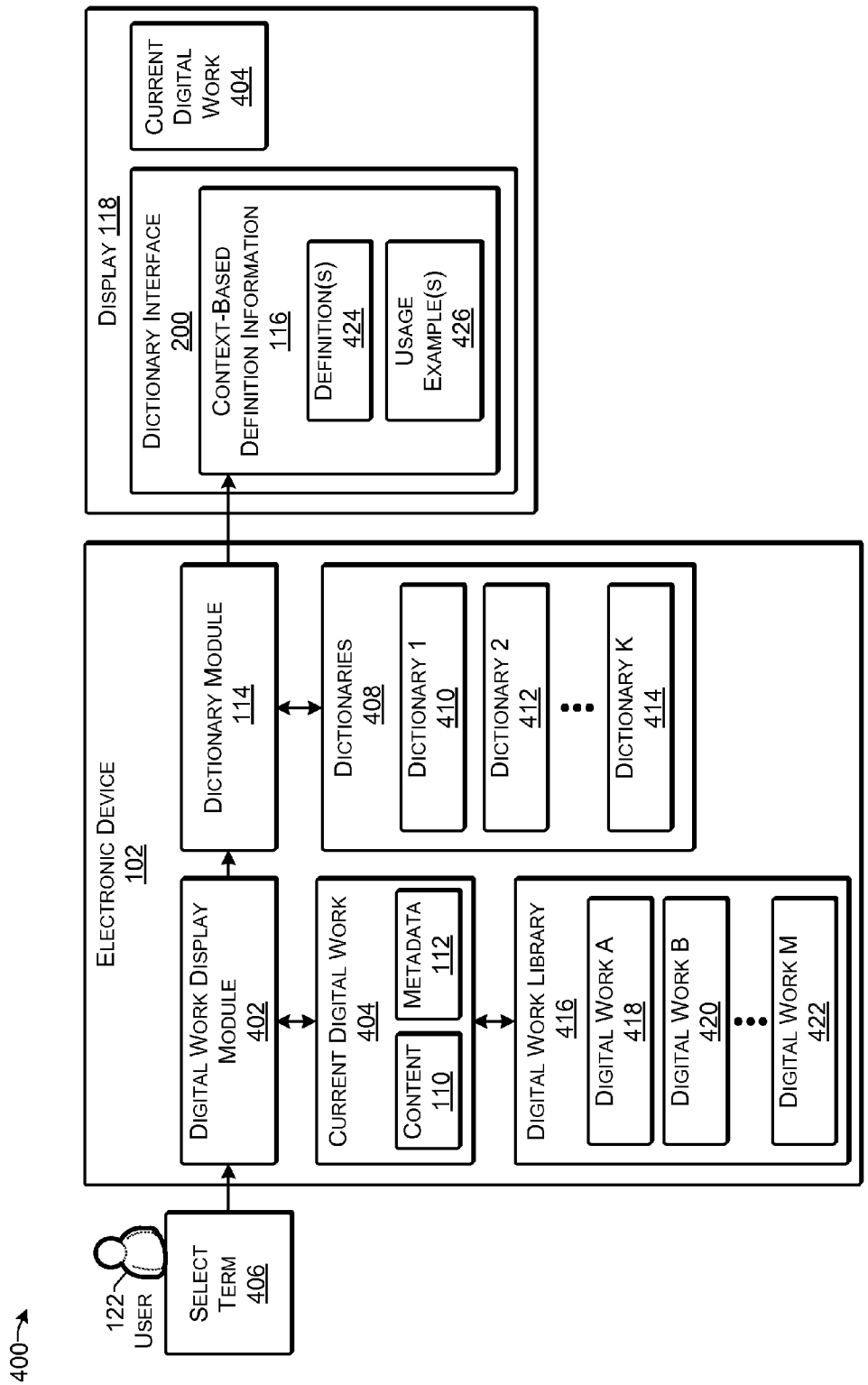
FIG. 4 illustrates an example framework for providing definition information in connection with one or more digital works according to some implementations.

FIG. 4 illustrates an example framework 400 for generating and displaying context-based definition information in connection with a digital work according to some implementations. In this example, the electronic device 102 includes a digital work display module 402, as well as the dictionary module 114 discussed above for generating the context-based definition information 116. In some implementations, the digital work display module 402 and the dictionary module 114 may be separate modules or applications. In other implementations, the digital work display module 402 and the dictionary module 114 may both be part of the same application or computer program for displaying content on the electronic device 102. In yet other implementations, the digital work display module 402 and the dictionary module 114 may represent different functionalities of the same module.

As one example, the digital work display module 402 may display a current digital work 404 on the display 118. In some examples, the display 118 may be part of the electronic device 102, and/or unitary with the electronic device 102. In other examples, the display 118 may be separate from the electronic device 102 and connected to or coupled with the electronic device 102. In any case, the digital work display module 402 may render content of the current digital work 404 on the display 118 for viewing by the user 122.

In some cases, while the digital work display module 402 is displaying the content of the current digital work 404, the electronic device 102 may receive a user selection 406 of a term in the text of the current digital work 404. In response, the dictionary module 114 may be executed to generate the context-based definition information 116 in the context of the current digital work 404. The dictionary module 114 may identify the current digital work 404, and may access the metadata 112 for the current digital work 404. For example, the dictionary module 114 may access the metadata 112 available for the current digital work 404, and may use the information contained therein, at least in part, to generate the context-based definition information 116. The context-based definition information 116 may be rendered on the display 118 in the dictionary interface 410, such as in a window, overlay, popup, or other interface displayed on the display 118.

Additionally, the dictionary module 114 may access one or more dictionaries 408 when generating the context-based definition information 116. In some instances, the electronic device 102 may include a plurality of dictionaries 408 such as a first dictionary 410, a second dictionary 412, . . . , a Kth dictionary 414. Each of the dictionaries 408 may be directed to a different category, language, subject matter, or the like. Further, as mentioned above, in some cases, the dictionaries 408 may be obtained by the electronic device 102 when downloading or otherwise acquiring particular digital works. Thus, in this example, the electronic device 102 may include a digital work library 416, which may include one or more digital works, such as a digital work A 418, a digital work B 420, . . . , a digital work N 422, and so forth.

Each of the digital works 418-422 in the digital work library 416 may include a respective corresponding instance of metadata 112, as described above (not shown in FIG. 4). Further, as mentioned above, in some instances the content 110 and metadata 112 for a particular digital work may be a single file, or two or more separate files. Additionally, at least some of the dictionaries 408 may correspond to at least some of the digital works in the digital work library 416. For example, the digital work provider 104 may have provided one or more of the dictionaries 408 in connection with one or more of the digital works in the digital work library 416, such as when a particular digital work is a type or category of digital work that would utilize a specialized dictionary, other than a general dictionary, or a dictionary in a different language, dialect, etc.

When the user selects a term from the current digital work 404, as indicated at 406, the dictionary module 114 may access the metadata 112 for the current digital work 404 to determine a category of the digital work 404, a language of the digital work 404, a publication date or author date of the digital work 404, and a dictionary hierarchy for the current digital work 404. In some examples, the dictionary hierarchy may be specified in the metadata 112 for the current digital work 404. In other examples, the dictionary module 114 may determine the dictionary hierarchy on the fly based on a category and/or subcategory of the current digital work 404.

Furthermore, in the case that the selected term is in a foreign language, in some cases, the dictionary module 114 may execute an algorithm to recognize the foreign language and, as a result, may reorder the dictionary hierarchy, such as to access an appropriate foreign language dictionary. In other examples, the metadata 112 for the digital work may specify the foreign language for the selected term. For instance, the dictionary module 114 may check the metadata 112 to determine whether the selected term is in a foreign language and may then determine a suitable dictionary hierarchy based on identifying the selected term as being in a foreign language.

The dictionary module 114 may select one or more definitions for the selected term by accessing the dictionaries 408 according to the dictionary hierarchy. For example, the dictionary module may start with the first dictionary in the dictionary hierarchy to determine whether there is a definition for the selected term provided in the first dictionary. If a definition for the selected term is located in the first dictionary, and if the part of speech identified for the selected term in the metadata matches the part of speech for the definition, then in some examples, the dictionary module does not check the other dictionaries in the hierarchy and presents the located definition as the selected definition in the dictionary interface 200.

In other examples, the dictionary module 114 may check one or more additional dictionaries in the hierarchy. Alternatively or additionally, in some cases, the first dictionary checked may contain multiple definitions for the selected term. Accordingly, the dictionary module 114 may compare the located definitions with the text surrounding the selected term in the digital work to determine whether the context of the term matches one or more of the located definitions.

As one example, suppose that two definitions are located for the selected term "billet," namely, a first definition that defines "billet" as "a place, usually a civilian's house, where soldiers are housed," and a second definition that defines "billet" as "a short thick piece of wood, such as for firewood." Thus, when automatically deciding between multiple possible candidate definitions, the dictionary module 114 may select the words used in each candidate definition and may search the adjoining text near to the selected term for matching or related words.

For instance, in the example described above with respect to FIGS. 2-3 in which the term "billet" is selected from the text of the digital work, the dictionary module 114 may identify the presence of the words "wood" and "firewood" in proximity to the term "billet" in the text of the digital work, such as on the same page, or within one or two paragraphs, or within some other threshold distance from the selected term, such as within 50 or 100 words, etc. Accordingly, the presence of the words, "wood" and "firewood" in the text surrounding the selected term, and the lack of presence of words from the other candidate definition, such as "soldier," "house" or "civilian," may lead to selection of the definition for "billet" as being "a short thick piece of wood, such as for firewood," rather than the alternative candidate definition of "a place, usually a civilian's house, where soldiers are housed." Thus, the dictionary module 114 may compare one or more words identified in surrounding text with one or more words in each candidate definition and select the candidate definition with the greatest probability based on a statistical comparison of words that match or that otherwise may be related. Furthermore, in some cases, the dictionary module 114 may further rely, at least in part, on crowd-sourced information, as discussed additionally below, to determine which candidate definition is likely to be more relevant for the selected term in the current context. Accordingly, following these considerations, the dictionary module 114 may display one or more selected definitions 424 in the dictionary interface 200.

Furthermore, the dictionary module 114 may search for one or more other occurrences of the selected term in the current digital work 404 to provide one or more examples of usage 426 of the selected term. In some cases, the dictionary module 114 may search the text of the current digital work 404, while in other cases, the dictionary module 114 may access an index included with the metadata 112. For example, the index may include location information of each occurrence of the selected term in the current digital work 404. The dictionary module 114 may extract one or more excerpts of text that include another occurrence of the selected term in the current digital work 404, such as by extracting a complete sentence that includes the other occurrence of the selected term.

Furthermore, the dictionary module 114 may also search for the selected term in other digital works, such as the digital works contained in the digital work library 416 on the electronic device 102. For example, the dictionary module may refer to an index in each of the metadata instances associated with each digital work in the digital work library to attempt to locate other usages of the selected term. In some cases, the dictionary module 114 may limit the number of examples of usage 426 that are displayed in the dictionary interface 200, while in other cases, the dictionary module 114 may include all of the located examples of usage 426.

Furthermore, the examples of usage 426 may be ordered according to a ranking process by taking into consideration a number of factors as mentioned above. For instance, the ranking may consider whether the examples of usage 426 are from the current digital work 404 or from other digital works in the digital work library 416, and may give a higher rank to examples from the current digital work 404. Furthermore, the ranking may consider whether the examples of usage 426 are from digital works that are in the same or similar categories, i.e., directed to the same or similar subject matter, e.g., works of fiction or non-fiction and so forth, and may give a higher ranking to these. Additionally, the ranking may consider a commonality of time periods, i.e., whether the digital works are from, relate to, or were authored during a similar time period, era or the like. For instance, if the works are of historical fiction from a similar era, or if the works were actually authored during the same decade, century, etc., and give a higher ranking to these. As another example, the ranking may favor digital works that a user has recently read, as these digital works may contain examples of usage that would be familiar to the user to enable the user to better recognize the context and meaning of the selected term. Additionally, in some cases where there are a large number of examples of usage, the examples of usage may be clustered to group together similar examples into the same clusters and then a single example may be selected from each cluster to be a representative example of usage for that cluster.

Figure 5:
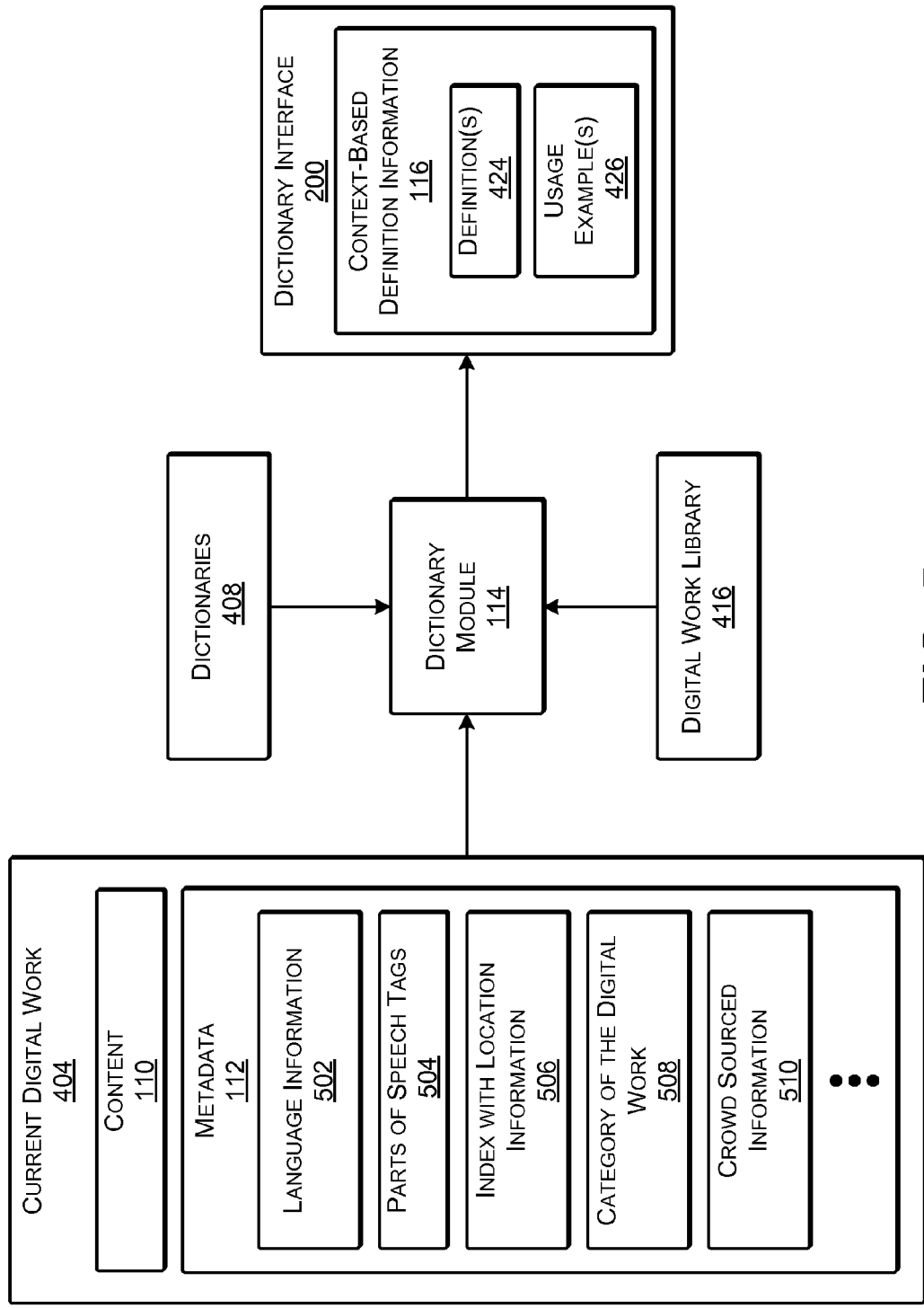
FIG. 5 illustrates select example portions of metadata of a digital work according to some implementations.

FIG. 5 illustrates an example of select portions of the metadata 112 of the digital work 404 according to some implementations. In this example, the metadata 112 for the current digital work 404 discussed above includes language information 502, parts of speech tags 504, an index 506, a category 508 of the digital work, and, in some cases, crowd-source information 510 related to one or more portions of the digital work. For instance, the language information 502 may identify the language of the digital work. Further, in some examples, the language information 502 may identify one or more particular terms contained in the digital work that are in a language different from the primary language of the digital work. As one example, the language of each term in the digital work may be recognized in advance and recorded in the language information 502. Accordingly, in some instances, the dictionary module may refer to the metadata language information 502 when determining whether to access a foreign language dictionary for a particular selected term. In other implementations, however, the dictionary module 114 may employ a language recognition algorithm to recognize whether a selected term is in a foreign language.

Furthermore, the parts of speech tags 504 may identify each term of one or more words in the text of the digital work as a particular part of speech such as one of a noun, verb, adjective, adverb, pronoun, conjunction, preposition, or interjection. Additionally, the index 506 may include location information for each term in the text of the digital work, and may cluster the occurrences of each term as entries in the index 506 along with the location information associated with each of the terms. In addition, the category 508 of the digital work may identify a subject, genre, type, etc. of the digital work, as discussed above. In some cases, the category 508 may be specified by the publisher, author, or other source of the digital work. Additionally, the crowd-sourced information 510 may include information provided by one or more users of an electronic device 102, a community website, or other crowd-sourcing option for providing information related to one or more terms, words, phrases, or the like in the digital work 404 that corresponds to the metadata 112. Additional crowd-sourcing examples are discussed below with respect to FIGS. 7-8. Furthermore, while several example portions of metadata 112 of the digital work 404 have been illustrated and described in this example, the metadata 112 is not limited to these portions of data, and may include various other types of metadata as will be apparent to those of skill in the art having the benefit of the disclosure herein.

Example Framework for Generating Metadata

Figure 6:
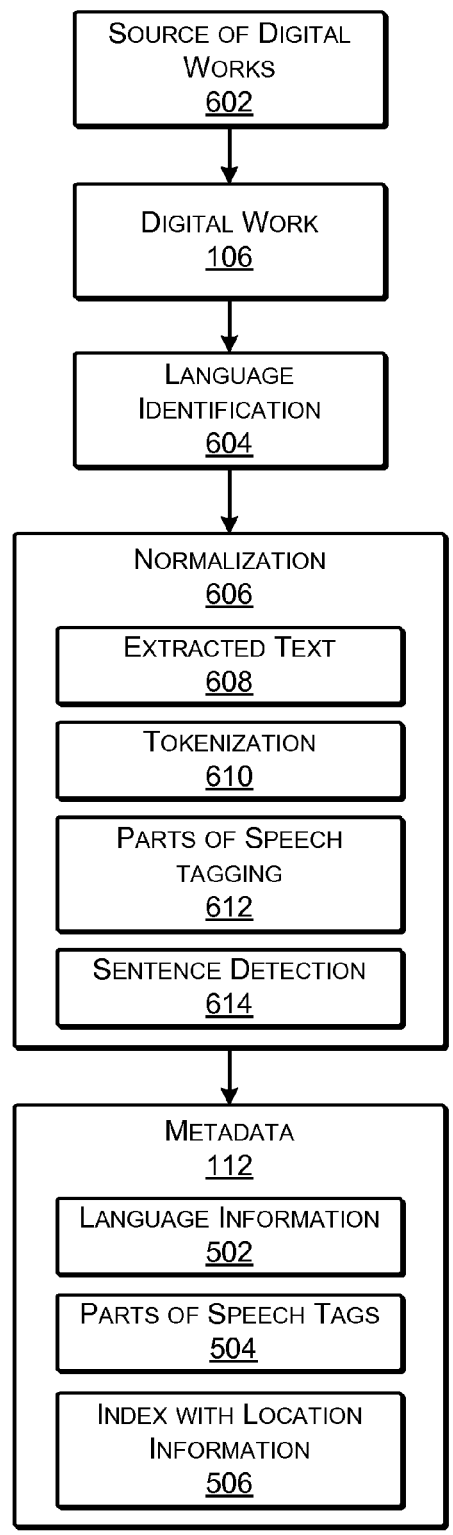
FIG. 6 illustrates an example framework that may be employed for generating metadata for a digital work according to some implementations.

FIG. 6 illustrates an example framework 600 that may be employed by a metadata generation module of the digital work provider 104 for generating metadata according to some implementations. In this example, the digital work provider may receive a digital work 106 from a source of digital works 602, such as from a publisher, an author, a digital work library, or other source of digital works. The digital work 106 may undergo language identification, as indicated at 604 to identify the language in which the text associated with the digital work 106 is written. In some examples, individual words that are in a different language from a primary language of the digital work are also identified.

Further, since digital works may be stored in a variety of different formats, the text of the digital work 106 may be normalized, as indicated at 606, by extracting the raw text from the digital work 106 to obtain extracted text 608. The normalization 606 may include tokenization 610 of the extracted text 608 of the digital work 106. Tokenization 610 may include parsing the text of the digital work into tokens that may include individual words, punctuation marks, symbols, etc., contained in the text of the digital work 106, and associating location information with each token identified in the digital work 106. Thus, each word, punctuation mark or symbol in the text of the digital work 106 may be assigned a unique location sequence or value.

As one example, the location information for a particular token may be based on an offset of the token from the beginning of the digital work and a number of characters in the token, which may be referred to as the length of the token. In other examples, the location of the text and punctuation marks in the digital work may be identified using coordinates of the words and punctuation marks. For example, a location of a bounding box for each word or punctuation mark may be identified by coordinates and page number. Additionally, in some examples, the entire text of a digital work may be tokenized using coordinate locations rather than a text offset. Thus, implementations herein are not limited to any particular technique for identifying a location of an individual word or term within the digital work. For example, numerous other location identification techniques may be employed such as by identifying x-y position coordinates of a token on a page of a digital work, by counting a number of words in a digital work and assigning a number to each word, by determining a page and line number for each token, etc. Furthermore, various other techniques for parsing a digital work and identifying the locations of terms, parts of speech, sentences, and the like in a digital work will also be apparent to those of skill in the art in light of the disclosure herein, with the foregoing being merely several non-limiting examples.

In addition, normalization 606 may include, or may be followed by, parts of speech tagging 612 and sentence detection 614. Parts of speech tagging 612 may include identification of parts of speech in the text of the digital work 106, such as nouns, verbs, adjectives, adverbs, and various other parts of speech, as discussed above. Thus, each token may be associated with at least one part of speech. In addition, sentence detection 614 may include identifying sentences, paragraphs, and chapters contained in the digital work 106. In some examples, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the location of the first token in the sentence or part of speech. Furthermore, in some examples, the parts of speech tagging may be performed incrementally one sentence at a time. Implementations herein are not limited to any particular technique for identifying locations of parts of speech, sentences, paragraphs, chapters or the like, in the digital work.

The terms in the digital work may subsequently be clustered with matching terms and mapped to a set of annotations or occurrences in the digital work. For example, the term "billet" might be mapped to 10 annotations because "billet" occurs 10 times in the digital work at 10 different locations. Thus, an index 506, as described above, may be generated with location information for each occurrence of each term in the digital work and parts of speech tags 504 may be associated with each term in the digital work. Accordingly, at least a portion of the metadata 112 described herein may be generated by the digital work provider 104 from the content of the digital work. Furthermore, while several examples of metadata had been described above, numerous other types of metadata may be generated for a digital work.

Example Crowd-Sourcing Interfaces

Figure 7:
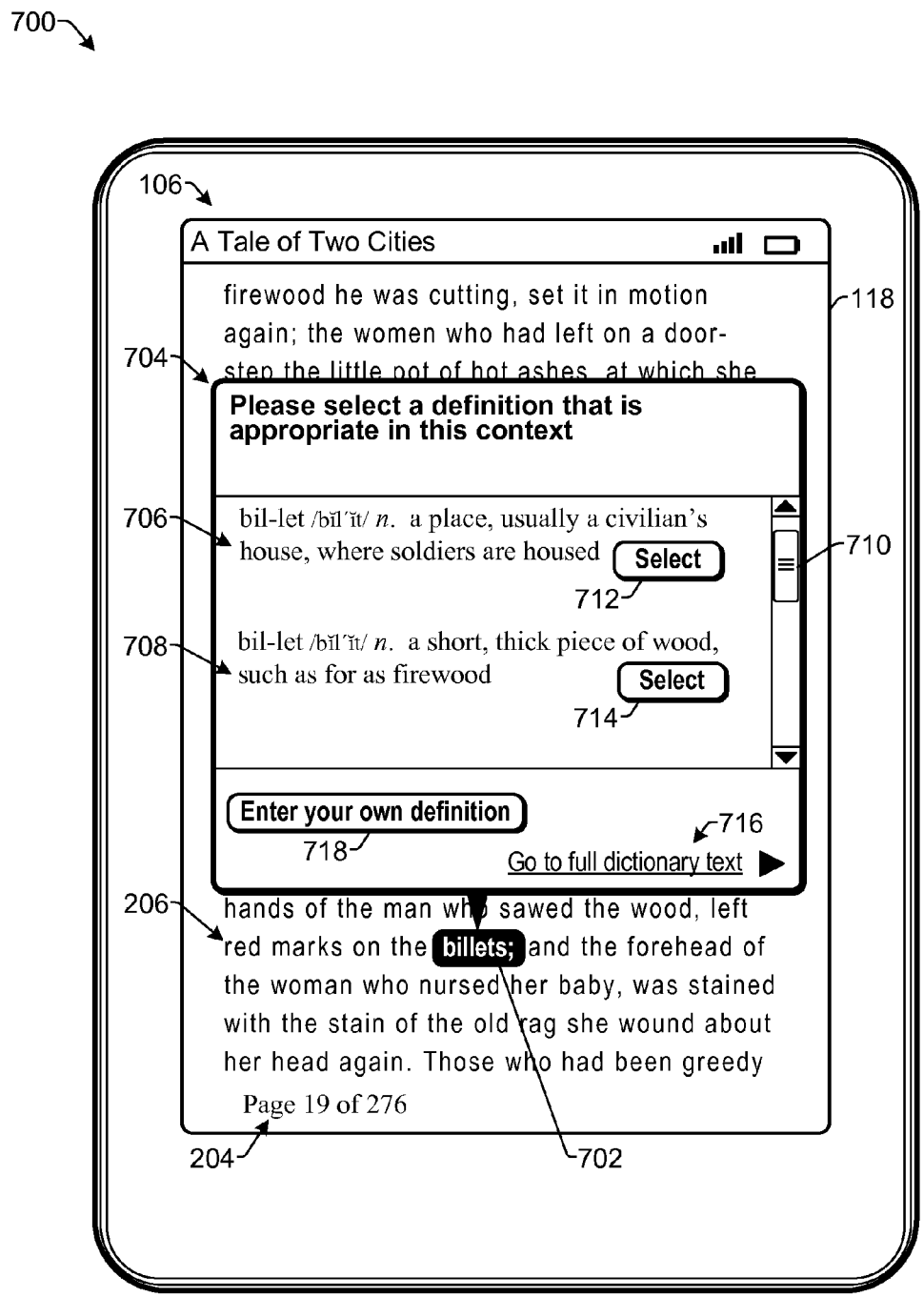
FIG. 7 illustrates an example dictionary interface for receiving crowd-sourced information according to some implementations.

FIG. 7 illustrates an example of a dictionary interface 700 that may be presented to the user on the electronic device 102 for obtaining crowd-sourced information according to some implementations. For instance, in some cases, the dictionary module 114 may be unable to ascertain a particular definition to select for a particular term. Consequently, the dictionary module 114 may present multiple definitions and rely on crowd-sourced input for determining which definition of the multiple definitions is the better definition for a particular term in a particular digital work.

In the example of FIG. 7, suppose that the user has selected the term "billets" 702 as described above with respect to FIG. 2, such as by touching the displayed term 702, tapping on the displayed term 702, or otherwise using an input action to select the term 702. In response to the user selection of the term 702, the dictionary interface 700 may be displayed on the display 118. The dictionary interface 700 may include a pop-up window 704 presented on the display 118 that may include multiple candidate definitions for the selected term 702, such as a first definition 706 and a second definition 708. For example, the first definition 706 may differ from the second definition 708. A slider or scroll bar 710 may enable the user to scroll down to view any other candidate definitions for the selected term 702.

In the illustrated example, the interface 700 may include a first select button 712 to enable the user to select the first definition 706, and a second select button 714 to enable the user to select the second definition 708. Additional select buttons may be associated with any additional candidate definitions presented in the interface 700. Accordingly, the user may actively select one of the definitions 706, 708 for the selected term 702 through activation of a user input device, e.g., a touch to the display, a mouse input, a joystick input, etc. The selection made by the user may be sent to the digital work provider 104 and aggregated with crowd-sourced information received from other users. Consequently, information from one or more users may be used to determine which of the candidate definitions 706, 708 should be provided for the selected term in the future to other users that might select the term 702 from the digital work 106. The usage examples provided for a selected term may similarly be determined or verified for accuracy by a similar crowd-sourcing technique. Furthermore, rather than having users select a button to indicate a preferred definition, other techniques may be used such as eye tracking, or less apparent techniques, such as merely determining which definition is viewed just before the user closes the dictionary interface 700. In addition, if the user wishes to view the full dictionary text for the selected term 702, the user may select a link 716 to see the other definitions or information on the selected term 702.

Furthermore, in some examples, a button or link 718 may be provided to enable a user to enter a definition for the selected term 702. For instance, suppose that the term "billet," as used in *A Tale of Two Cities*, is a metaphor for the victims of the French guillotine. Accordingly, such information would not be included in a typical dictionary definition. Consequently, crowd sourcing may be relied on to obtain this information, such as by receiving the information from one or more users.

Figure 8:
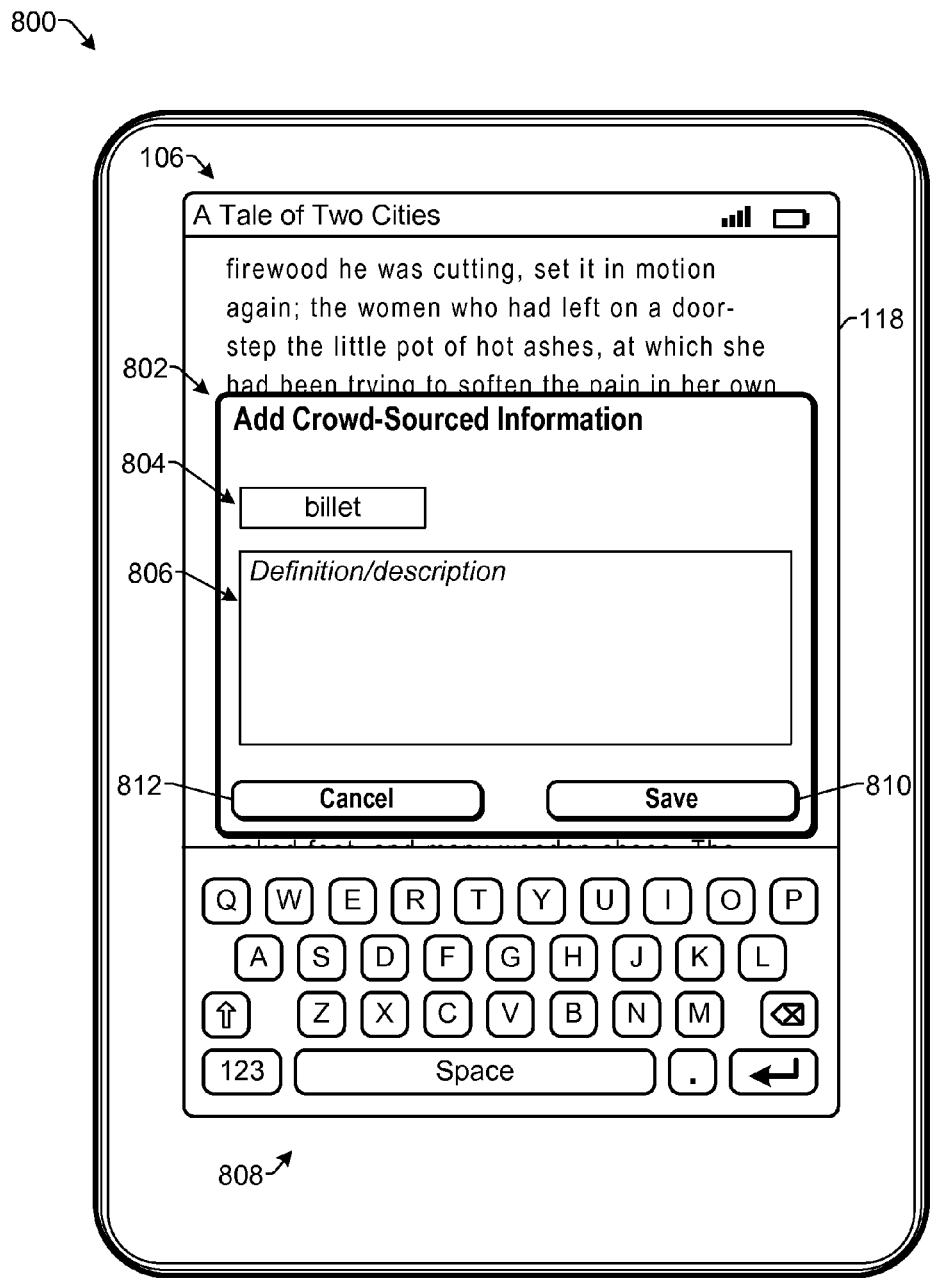
FIG. 8 illustrates an example dictionary interface for receiving crowd-sourced information according to some implementations.

FIG. 8 illustrates an example crowd-sourced information interface 800 that may be presented upon selection of the link 718 in the dictionary interface 700 to enable a user to add a definition or description for a selected term. The interface 800 includes a pop-up window 802 that may include a first box 804 that includes the selected term, and a second box 806 that includes an area for the user to enter a definition or description of the selected term. For example, in the case that the display 118 is a touchscreen, a virtual keyboard 808 may be presented to enable the user to enter the definition or description in the second box 806. When the user has finished entering the description of the selected term, the user may select a save button 810 to save the entered description. The description may then be sent to the digital work provider, to a community website, or other crowd-source information repository for the digital work. Alternatively, if the user decides not to enter and or save the description, the user may select a cancel button 812. Furthermore, while several examples of obtaining and using crowd-sourced information have been described in the context of a digital work, numerous other implementations will be apparent to those of skill in the art in view of the disclosure herein.

Example System Architecture

Figure 9:
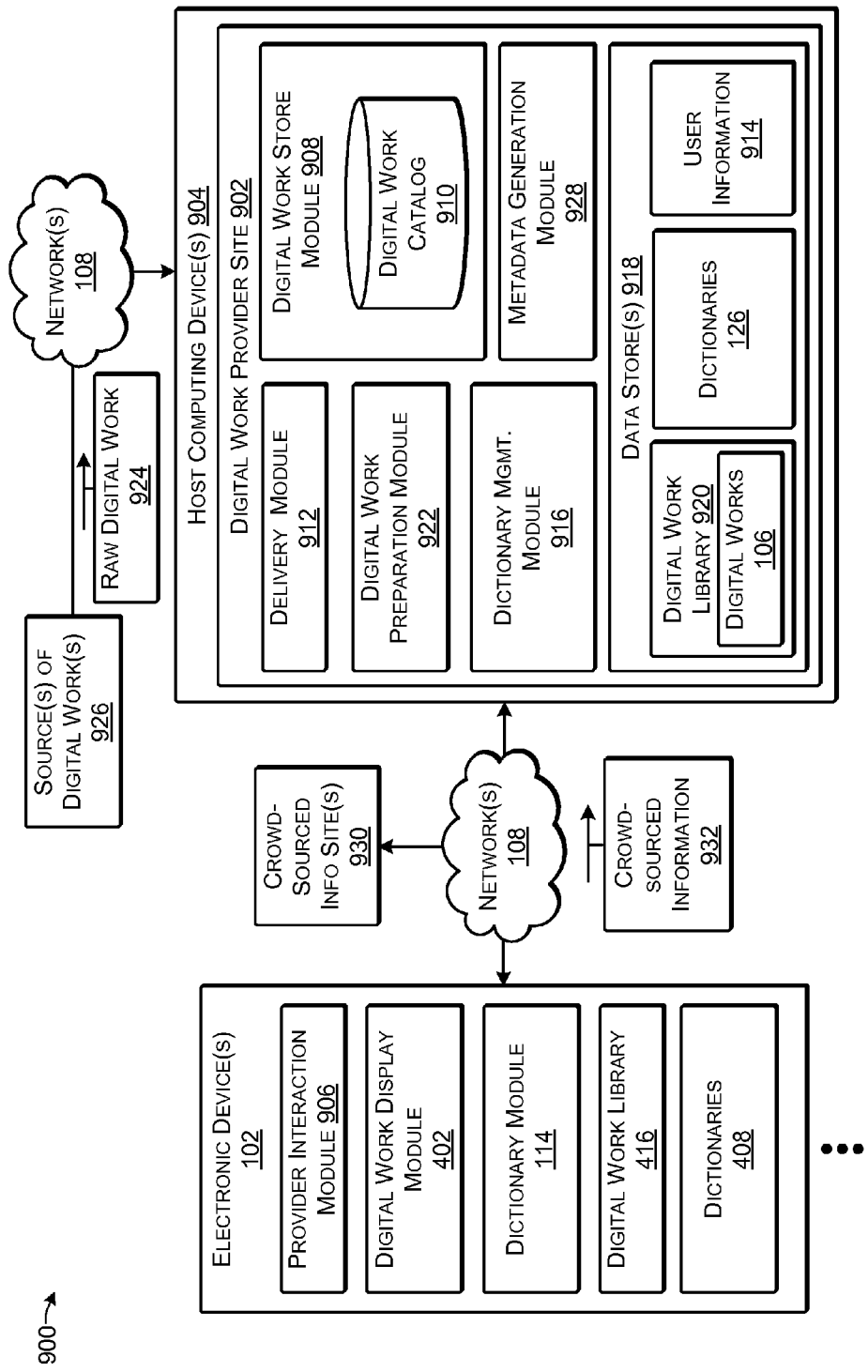
FIG. 9 illustrates an example architecture of a system for providing definition information in connection with one or more digital works according to some implementations.

FIG. 9 illustrates an example architecture of a system 900 including a digital work provider site 902 for providing one or more digital works 106 and/or one or more dictionaries 126 to one or more electronic devices 102 according to some implementations. As one example, the digital work provider site 902 may be a merchant website, an e-commerce site, or the like, that offers digital works 106 to the public. In some implementations, the digital work provider site 902 may offer digital works 106, such as books, magazines, newspapers, songs, movies, and so forth, to the public through a website, other type of electronic commerce site, an online location, or the like.

In some examples, the digital work provider site 902 may alternatively, or additionally, provide digital works 106 through an online or mobile application executing on the electronic device 102. For example, an application on the electronic device 102 may connect to or obtain content from the digital work provider site 902 to enable the purchase or management of digital works 106, and the like. Thus, the digital work provider site 902 may enable the electronic device 102 to access digital works 106 through an online or mobile application executing on a mobile device, such as an eBook reader, smart phone, tablet computing device, or the like. Accordingly, the digital work provider site 902 is not limited to a website accessed by a browser, but may encompass other technologies for obtaining digital works 106, such as through in-application shopping, and the like.

The digital work provider site 902 is able to communicate with one or more electronic devices 102 through one or more networks 108. For example, the network(s) 108 may include a local area network (LAN), a wide area network (WAN), such as the Internet, or any combination thereof, and may include both wired and wireless communication technologies using any suitable protocols and communication techniques. The digital work provider site 902 and the electronic device 102 may communicate and interact with one another using any combination of suitable communication and networking protocols, such as Internet protocol (IP), transmission control protocol (TCP), hypertext transfer protocol (HTTP), and so forth.

In some implementations, the digital work provider site 902 may be hosted on one or more host computing devices 904. As one example, the host computing device(s) 904 may be one or more web servers located at a data center, server farm, or other single physical location. In other examples, the digital work provider site 902 or portions thereof may be located in diverse locations that are physically remote from one another. Further, in some implementations, the digital work provider site 902 may be a group of websites, data stores, services, and the like, hosted on a plurality of different host computing devices 904 in a plurality of diverse locations, or hosted by one or more host computing devices 904 at a single location.

In the illustrated example, the electronic device 102 may include the digital work display module 402, the dictionary module 114, the digital work library 416, and the dictionaries 408, as discussed above with reference to FIGS. 1 and 4. For example, in response to a user selection of a term in a displayed digital work, the dictionary module 114 may display definition information related to the selected term.

The electronic device 102 may further include a provider interaction module 906, which in some instances may be an application, such as a web browser, mobile application, or other module or computer program configured to receive web content, webviews, online content, or the like, for accessing and interacting with the digital work provider site 902. For example, the provider interaction module 906 may enable the user 122 to shop for digital works at the digital work provider site 902 and access or receive digital works 106 and dictionaries 126 from the digital work provider site 902, such as by downloading through the network(s) 108. Further, in some implementations, the provider interaction module 906 may enable the user 122 to organize or manage the digital works on the electronic device 102, while in other implementations, a separate management module (not shown) may provide this functionality.

The digital work provider site 902 may include a digital work store module 908 that may provide or may access a digital work catalog 910. For example, the digital work store module 908 may present the digital work catalog 910 to an electronic device 102 that accesses the digital work provider site 902 to shop for a digital work 106. The digital work catalog 910 may include searchable and/or browsable listings and descriptions of digital works 106 available from the digital work provider site 902. The digital work store module 908 may communicate with the provider interaction module 906 on the electronic device 102 to enable the user 122 to locate and acquire a digital work 106 from the digital work provider site 902.

The digital work provider site 902 may further include a delivery module 912 that may deliver a digital work to the electronic device 102 and/or the user 122. For example, in some instances, the delivery module 912 may facilitate the download of a digital work to the electronic device 102 over the network(s) 108. In other instances, the delivery module 912 may provide for delivery of a hard copy of the digital work to the user, such as by delivery of a recording medium that maintains a copy of the digital work, depending on the nature of the digital work and the electronic device 102.

Furthermore, in some implementations, the delivery module 912 may refer to user information 914 to determine one or more digital works 106 or one or more dictionaries 126 to download to the electronic device 102. For example, the user information 914 may include account information, a purchase history, a user library, or other records of digital works and dictionaries of the user 122. Accordingly, in some instances, the delivery module 912 may assist in synchronizing the content of multiple devices of a single user or a single account.

The digital work provider site 902 may further include a dictionary management module 916. In some examples, the dictionary management module 916 may provide the dictionary module 114 to the delivery module 912 to make the dictionary module 114 available to the electronic devices 102. Furthermore, the dictionary management module 916 may provide updates to the dictionary modules 114 on the electronic devices 102. In addition, the dictionary management module 114 may collect and aggregate crowd-sourced definition information from multiple electronic devices 102, as discussed additionally below.

The digital work provider site 902 may also include various other site components as is known, depending on the design and intended use of the digital work provider site 902. For example, other site components may include one or more pages of content, such as webpages, webviews, or other online content, that may be presented to the user 122 through the provider interaction module 906, such as during shopping for digital works from the digital work provider site 902.

The digital work provider site 902 may include or may access one or more data stores 918 that include a digital work library 920, dictionaries 126, and the user information 914. For example, the digital work library 920 may include a plurality of digital works 106 that the digital work provider has available for access by electronic devices 102, such as by purchase through the digital works catalog 910. The dictionaries 126 may include one or more dictionaries for at least some of the digital works 106 in the digital work library 920. Further, the user information 914 may include information for a plurality of users 122 of the digital work provider site 902. For example, the user information 914 may include account information for each user for identifying and interacting with the user, such as name, email address, mailing address, telephone number, user identification (ID) number, user purchase history (e.g., digital works and dictionaries acquired by the user) so forth.

The digital work provider site 902 may also include a digital work preparation module 922 that may receive raw digital works 924 from one or more sources of digital works 926. For example, the sources of digital works 926 may be publishers, authors, movie distributors, studios, music companies, artists, and so forth. In the case of textual digital works, the digital work preparation module 922 may receive a raw digital work 924 from the publisher, author, or other source of digital works 926, and may parse and process the raw digital work 924 to make the digital work compatible with various display formats, device platforms, and so forth.

The digital work provider site 902 may further include a metadata generation module 928, which may operate on the digital works 106 in the digital works library 920 to produce the metadata 112 for each digital work 106 as described above with reference to FIG. 6. For example, the metadata generation module 928 may select a particular digital work 106 from the digital work library 920 for generating metadata 112 for the particular digital work 106, such as based on the framework 600 described above with reference to FIG. 6.

In addition, in some cases, the digital work provider may provide one or more terms from a digital work to a crowd-sourced information site 930 to encourage crowd participation in providing definition information related to one or more terms for which definition information cannot be determined or for which definition information is desired to be verified. For example, community-sourced, social-network-generated, or crowd-sourced information (referred to herein as "crowd-sourced information" 932) may be information provided for a particular digital work by users that have read the particular digital work, or that otherwise have knowledge of the digital work. Thus, the users of a crowd-sourced information site 930 may provide information about particular terms in the digital work for which the digital work provider or other users may have requested definition information.

In some instances, a plurality of users may provide the crowd-sourced information 932 through one or more interfaces provided on the devices 102, such as during consumption of a digital work 106. In other instances, one or more users may access the social networking site 930, such as through a web browser, a mobile application, an online application, or the like, to provide definition information related to a particular digital work 106. As one example, the crowd-sourced information site 930 may be the Shelfari® website (shelfari.com) or other site that provides a forum for book enthusiasts to discuss books, review, catalog and organize books they have read, socialize with other readers, create discussions about books, and send recommendations regarding books. The digital work provider 104 may provide any definition information acquired from crowd-sourced information 932 to the dictionary modules 114 on the electronic devices 102 that have access to the digital work. The digital work provider 104 may further provide other types of definition information to the electronic devices 100 in addition to the crowd-sourced information.

Furthermore, in some examples, the dictionary management module 916 may aggregate crowd-sourced information 932 received from a plurality of electronic devices 102 from a plurality of different users. Accordingly, the dictionary management module 916 may update the dictionary module 114 to enable the dictionary module 114 to provide crowd-sourced definitions for particular terms in particular digital works based on the aggregated information. Numerous other variations will be apparent to those of skill in the art in light of the disclosure herein.

Example Electronic Device

Figure 10:
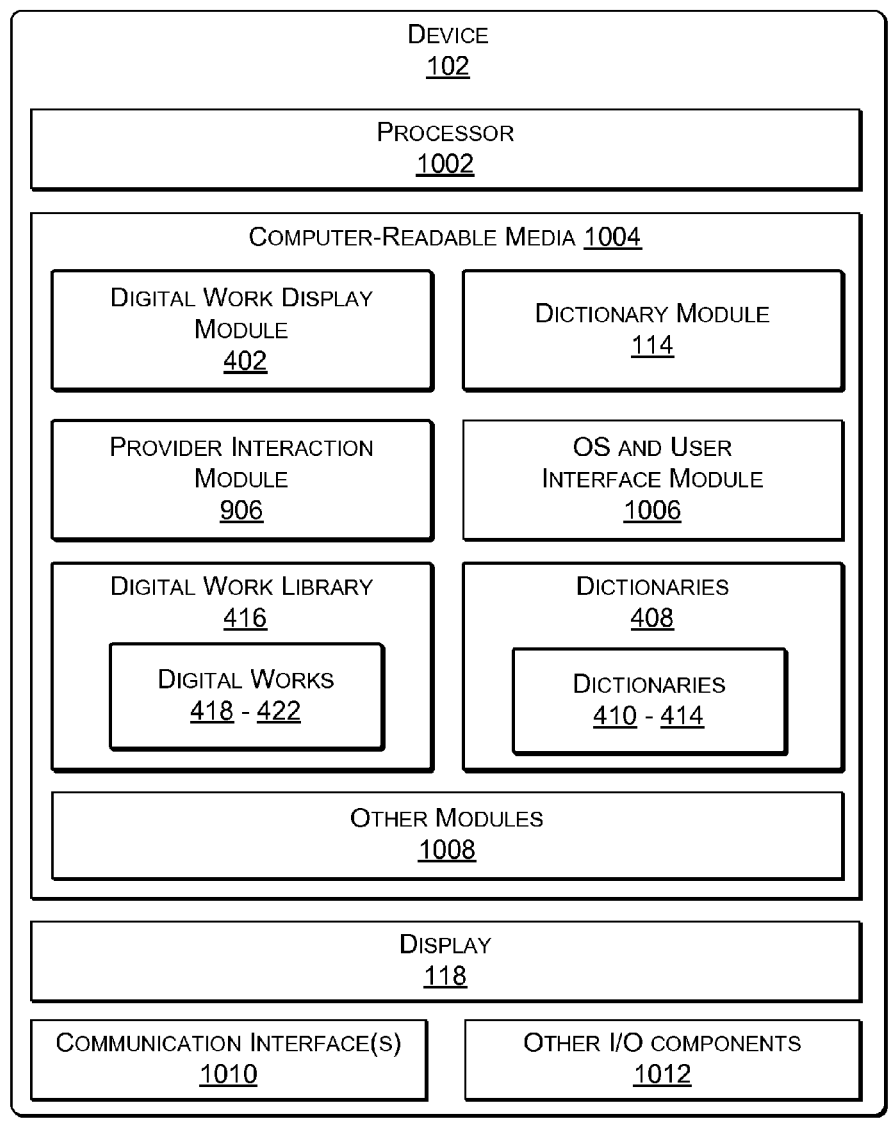
FIG. 10 illustrates select components of an example electronic device according to some implementations.

FIG. 10 illustrates select example components of the electronic device 102 that may be used to implement the functionality described above according to some implementations. In a very basic configuration, the electronic device 102 includes, or accesses, components such as at least one processor 1002 and a computer-readable media 1004. Each processor 1002 may itself comprise one or more processors or cores. Depending on the configuration of the electronic device 102, the computer-readable media 1004 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1002 directly or through another computing device. Accordingly, the computer-readable media 1004 may be computer-readable media able to maintain instructions, modules or components executable by the processor 1002.

The computer-readable media 1004 may be used to store any number of functional components that are executable by the processor 1002. In some implementations, these functional components comprise instructions or programs that are executable by the processor 1002 and that, when executed, implement operational logic for performing the actions attributed above to the electronic device 102. Functional components of the electronic device 102 stored in the computer-readable media 1004 may include the digital work display module 402 and the dictionary module 114, as described above, which may be executed on the processor 1002 for displaying the digital works 418-422 in the digital work library 416, and for generating definition information for the digital works 418-422, respectively. Additional functional components stored in the computer-readable media 1004 may include the provider interaction module 906, executable by the processor 1002 for obtaining the digital works 418-422 and the corresponding dictionaries 410-414 from the digital work provider site 902. Other functional components may include an operating system and user interface module 1006 for controlling and managing various functions of the electronic device 102. Depending on the type of the electronic device 102, the computer-readable media 1004 may also optionally include other functional components, such as other modules 1008, which may include applications, programs, drivers and so forth.

The computer-readable media 1004 may also store data, data structures, and the like that are used by the functional components. For example, data stored by the computer-readable media 1004 may include the digital work library 416, containing the digital works 418-422, and the dictionaries 408 including dictionary instances 410-414. The electronic device 102 may also include other data, which may include, for example, data used by the provider interaction module 906, the operating system and user interface module 1006, and the other modules 1008. Further, the electronic device 102 may include many other logical, programmatic and physical components, of which those described are merely examples that are related to the discussion herein.

FIG. 10 further illustrates the display 118, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 118 may be an active display such as a liquid crystal display, plasma display, light emitting diode display, organic light emitting diode display, and so forth. These displays may comprise drive electronics, such as a display drive matrix configured to affect individual pixels within the display 118. Additionally, in some implementations, the display 118 may be a 3D display capable of providing a 3D image. For example, the display 118 may produce a 3D image by providing alternating left-eye and right-eye images with or without the use of shuttering or filtering eyeglasses. Accordingly, in some implementations, the visual representations and other user interface components herein may be rendered in 3D.

One or more communication interfaces 1010 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1010 may allow a user of the electronic device 102 to access the World Wide Web, download digital works and dictionaries from the digital work provider site 902, access online content, such as from a website or other network location, and the like. The communication interface 1010 may further allow a user to access storage on another device, such as a user's computing device, a network attached storage device, or the like.

The electronic device 102 may further be equipped with various other input/output (I/O) components 1012. Such I/O components may include a touchscreen and various user controls (e.g., buttons, a joystick, a keyboard, a mouse, etc.), speakers, a microphone, a camera, connection ports, and so forth. For example, the operating system 1006 of the electronic device 102 may include suitable drivers configured to accept input from a keypad, keyboard, or other user controls and devices included as the I/O components 1012. For instance, the user controls may include page turning buttons, navigational keys, a power on/off button, selection keys, and so on. Additionally, the electronic device 102 may include various other components that are not shown, examples of which include removable storage, a power source, such as a battery and power control unit, a global positioning system (GPS) device, a PC Card component, and so forth.

Example Computing Devices

Figure 11:
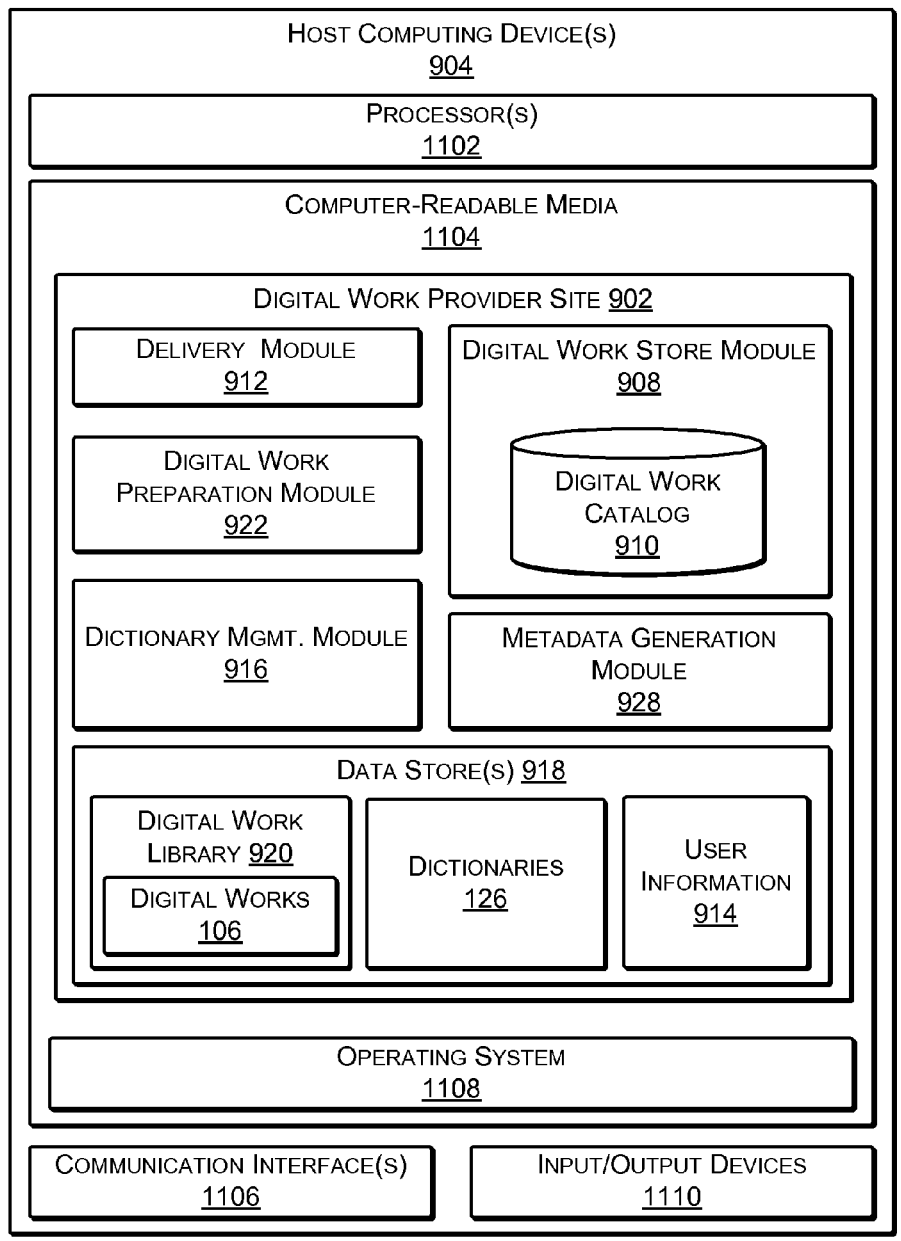
FIG. 11 illustrates select components of one or more example host computing devices of a digital work provider according to some implementations.

FIG. 11 illustrates select components of one or more host computing devices 904 that may be used to implement the functionality of the digital work provider site 902 according to some implementations. The digital work provider site 902 may be hosted on one or more servers or other types of computing devices that may be embodied in any number of ways. For instance, in the case of a server, the digital work provider site 902 may be implemented on a single server, a cluster of servers, a server farm or data center, a cloud hosted computing service, and so forth, although other computer architectures (e.g., a mainframe architecture) may also be used. Further, while the figures illustrate the components of the digital work provider site 902 as being present in a single location, it is to be appreciated that these components may be distributed across different computing devices and locations in any manner. Generally, the digital work provider site 902 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 11, an example host computing device 904 includes one or more processors 1102, one or more computer-readable media 1104, and one or more communication interfaces 1106. The processor(s) 1102 may be a single processing unit or a number of processing units, and may include single or multiple computing units or multiple cores. The processor(s) 1102 can be configured to fetch and execute computer-readable instructions stored in the computer-readable media 1104 or other computer-readable media.

The computer-readable media 1104 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 904, the computer-readable media 1104 may be a type of computer-readable storage media and may be a non-transitory storage media.

The computer-readable media 1104 may be used to store any number of functional components that are executable by the processors 1102. In many implementations, these functional components comprise instructions or programs that are executable by the processors 1102 and that, when executed, implement operational logic for performing the actions attributed above to the digital work provider site 902 and digital work provider 104. Functional components of the digital work provider site 902 that may be executed on the processors 1102 for implementing the various functions and features related to providing digital works and dictionaries, as described herein, include the digital work store module 908, the delivery module 912, dictionary management module 916, the digital work preparation module 922, and the metadata generation module 928. Additional functional components stored in the computer-readable media 1104 may include an operating system 1108 for controlling and managing various functions of the host computing device(s) 904.

In addition, the computer-readable media 1104 may include, or the host computing device(s) 904 may access, the data store(s) 918, which may include the digital work library 920, including the digital works 106, as well as the dictionaries 126 and the user information 914. In addition, the computer-readable media 1104 may store or the host computing devices(s) 904 may access the digital work catalog 910 used by the digital work store module 908. The host computing device(s) 904 may also include many other logical, programmatic and physical components, of which those described above are merely examples that are related to the discussion herein.

The communication interface(s) 1106 may include one or more interfaces and hardware components for enabling communication with various other devices, such as the electronic devices 102, over the network(s) 108. For example, communication interface(s) 1106 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 108 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 904 may further be equipped with various input/output devices 1110. Such I/O devices 1110 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 12-15 illustrate example processes for employing a dictionary in connection with a digital work according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

Figure 12:
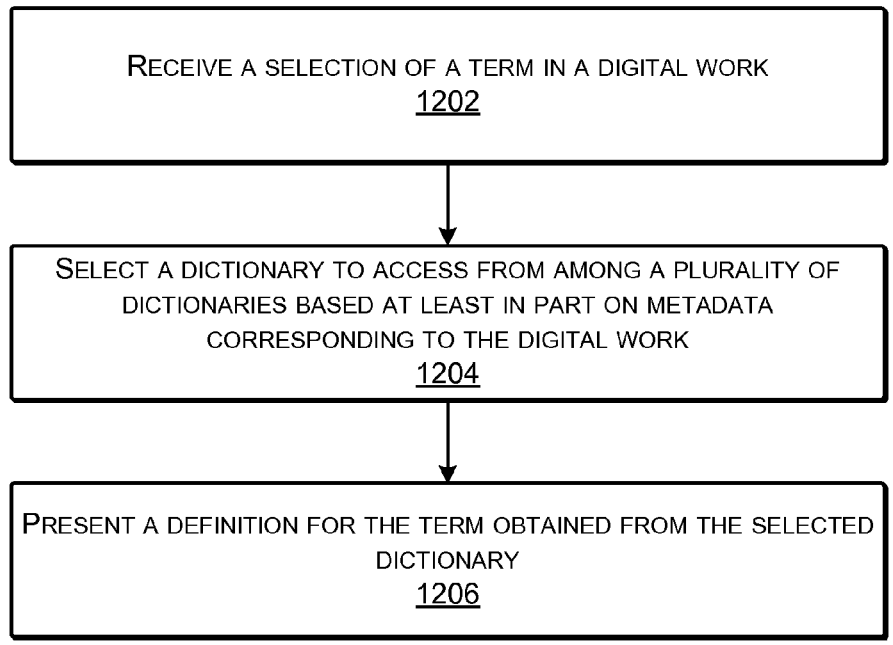
FIG. 12 is a flow diagram illustrating an example process executed on an electronic device for providing definition information in connection with a digital work according to some implementations.

FIG. 12 is a flow diagram illustrating an example process 1200 that may be executed by the electronic device 102 for generating definition information in connection with a digital work according to some implementations.

At 1202, the electronic device receives a selection of a term in a digital work. In some examples, the device may receive an input, such as a selection of a term, to initiate the dictionary interface while a particular digital work is being presented or displayed on the device.

At 1204, the dictionary module selects a dictionary to access from among a plurality of dictionaries based at least in part on metadata corresponding to the digital work. For example, the dictionary module may select a dictionary according to a hierarchy, such as selecting a dictionary in the same technical field, related to the same subject, or corresponding to the same foreign language as the digital work.

At 1206, the dictionary module presents a definition for the term obtained from the selected dictionary. For example, the dictionary module may locate a definition for the term in the dictionary selected first according to the hierarchy. The dictionary module may display the definition information in a dictionary interface as a pop-up or overlay on top of a presentation of the digital work. In other examples, the dictionary module may display the definition information in a separate full-screen interface regardless of whether a digital work is displayed or not.

Figure 13:
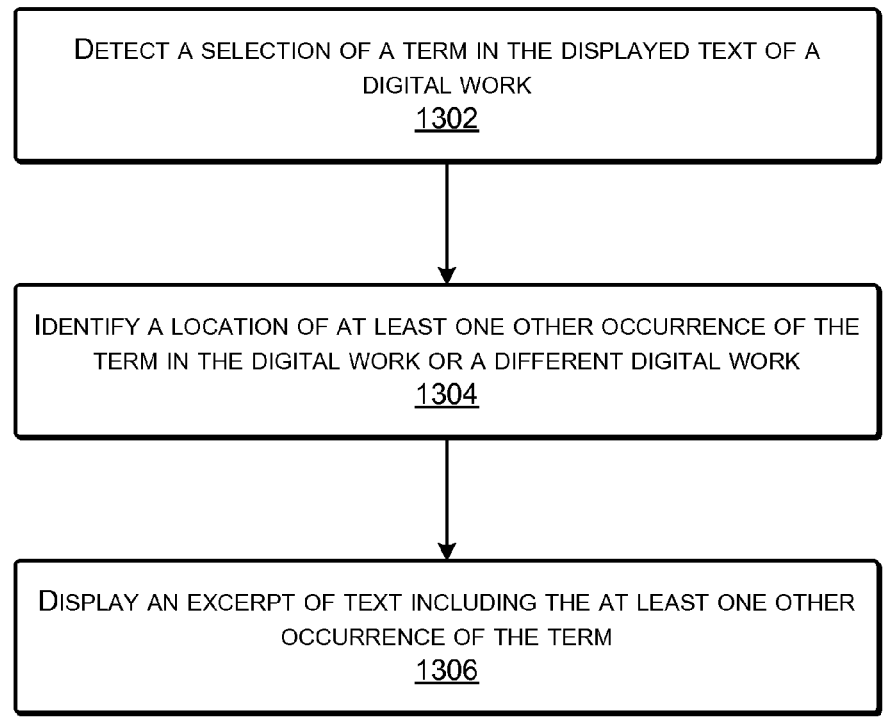
FIG. 13 is a flow diagram illustrating an example process executed on an electronic device for providing definition information in connection with a digital work according to some implementations.

FIG. 13 is a flow diagram illustrating an example process 1300 that may be executed by the electronic device 102 for generating definition information in connection with a digital work according to some implementations herein.

At 1302, the electronic device detects a selection of a term in the displayed text of a digital work. For example, the electronic device may detect the input of a user to select a particular term of the text of a digital work.

At 1304, the dictionary module may identify a location of at least one other occurrence of the selected term in the digital work or in a different digital work. For example, the dictionary module may access an index included in metadata for the digital work or in metadata for one or more different digital works to locate other occurrences of the selected term.

At 1306, the dictionary module displays an excerpt of text including the at least one other occurrence of the term. For example, the dictionary module may display one or more excerpts of text corresponding to one or more other occurrences of the term in the same digital work or in one or more different digital works.

Figure 14:
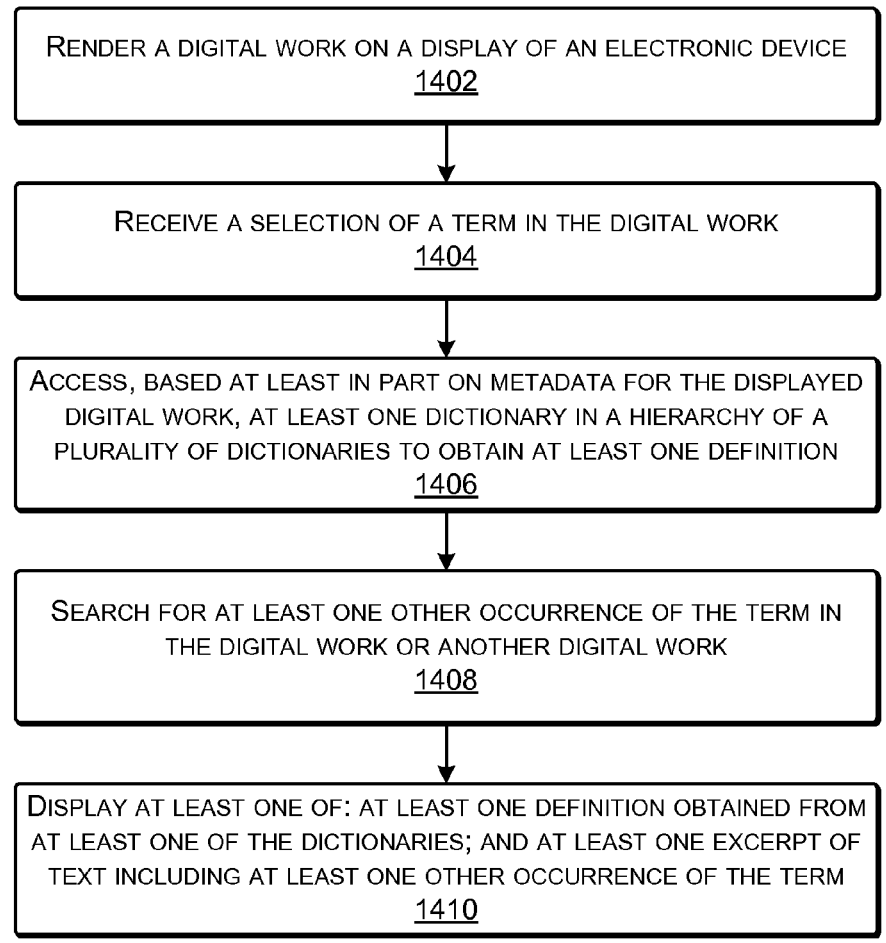
FIG. 14 is a flow diagram illustrating an example process executed on an electronic device for providing definition information in connection with a digital work according to some implementations.

FIG. 14 is a flow diagram illustrating an example process 1400 that may be executed by the electronic device 102 for generating definition information in connection with a digital work according to some implementations herein.

At 1402, the electronic device renders a digital work on the display of the device. For example, the text of a digital work may be presented on the display of the device.

At 1404, the electronic device receives a selection of a term in the digital work, such as through a user input.

At 1406, the dictionary module accesses, based at least in part on metadata for the displayed digital work, at least one dictionary in a hierarchy of a plurality of dictionaries to obtain at least one definition. For example, based on the metadata associated with a digital work, the dictionary module may establish a hierarchy of dictionaries to access successively to obtain a definition related to the term selected from the digital work.

At 1408, the dictionary module searches for at least one other occurrence of the selected term in the digital work or in another digital work. For example, the dictionary module may search an index contained in the metadata for the digital work and/or may search indexes included in metadata for other digital works to attempt to locate other occurrences of the selected term in the current digital work and/or the other digital works.

At 1410, the dictionary module displays at least one of: at least one definition obtained from at least one of the dictionaries; and at least one excerpt of text including at least one other occurrence of the term. For instance, the at least one excerpt may be taken from the current digital work, or from a different digital work, such as a digital work maintained in the digital work library of the electronic device.

Figure 15:
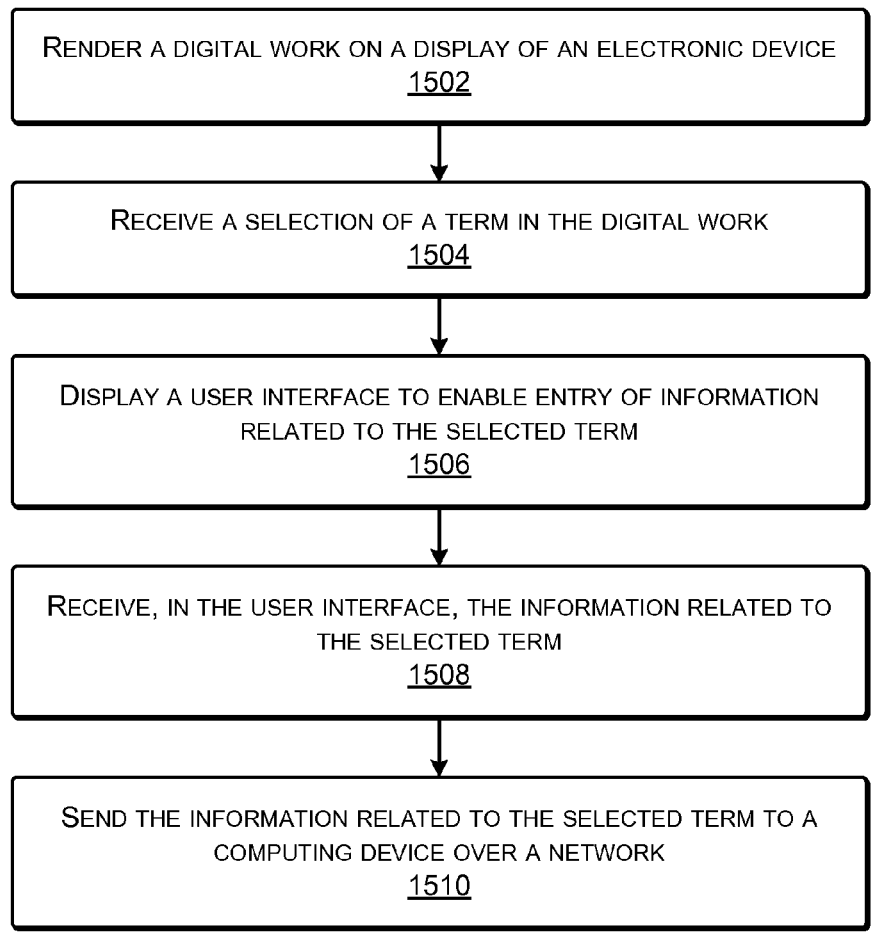
FIG. 15 is a flow diagram illustrating an example process for providing crowd-sourced definition information in connection with a digital work according to some implementations.

FIG. 15 is a flow diagram illustrating an example process 1500 that may be executed by the electronic device 102 for obtaining crowd-sourced information in connection with a digital work according to some implementations herein.

At 1502, a digital work is rendered on a display of an electronic device. For example, the text of the digital work may be rendered on the display.

At 1504, a selection of a term in the digital work is received. For example, a user input to select a term in the digital work may be detected by the electronic device.

At 1506, the dictionary module displays a user interface to enable entry of information related to the selected term. For example, if the dictionary module is unable to locate definition information for the selected term, or is unable to determine definition information for the selected term, the dictionary module may present a user interface to enable the user to enter information related to the selected term.

At 1508, the user interface receives entry of information related to the selected term. In some instances, the user may enter definition or description information related to the selected term. In other examples, the user may select one of multiple displayed definitions related to the selected term.

At 1510, the dictionary module sends the information related to the selected term to a computing device over a network. For example, in the case that the user enters definition or description information related to the selected term, the information may be sent over the network to the digital work provider or to another site that aggregates the information. Similarly, in the case that the user selects one of multiple presented definitions, the selection made by the user may be sent over the network to the digital work provider or to another site that aggregates the information.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Figure 16:
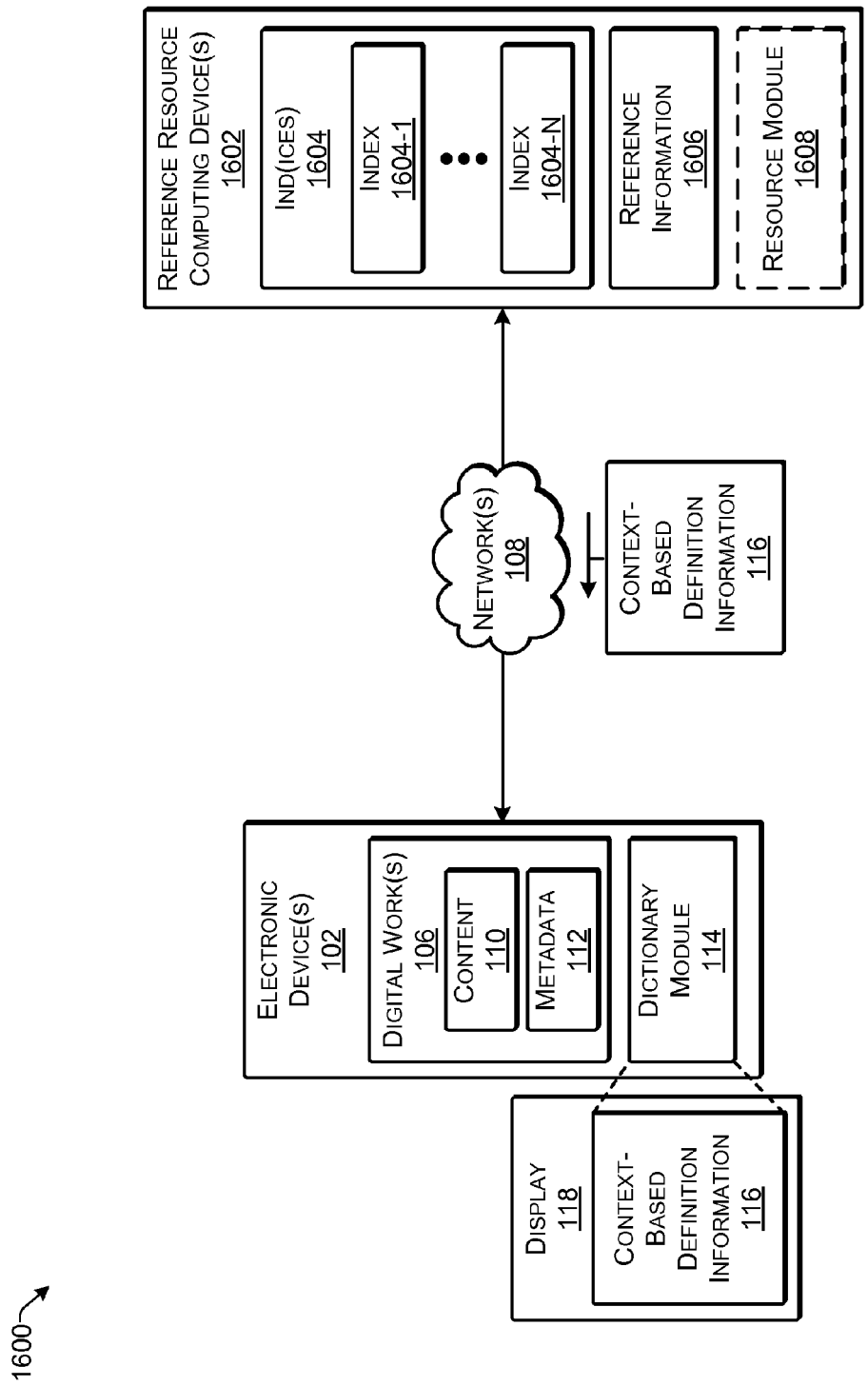
FIG. 16 illustrates an example system architecture for obtaining context-based definition information from a reference resource according to some implementations.

FIG. 16 illustrates an example system architecture 1600 for obtaining context-based definition information 116 from a reference resource according to some implementations. For instance, rather than accessing a hierarchy of dictionaries maintained on the electronic device 102, the dictionary module 114 may access one or more reference resource computing devices 1602, such as over the network(s) 108. In this example, the reference resource computing device 1602 may include a set of one or more digital indexes (indices), such as index 1604-1, . . . , index 1604-N. The set of indices may index or refer to reference information 1606. As one example, each index 1604 may correspond to a different category, subcategory, foreign language, or so forth, as discussed above with respect to the different dictionaries. In some examples, the reference resource computing device 1602 may be, or may have hardware and at least some functional components similar to the host computing device(s) 904 discussed above.

When a term is selected from a particular digital work 106 by a user of the electronic device 102, the dictionary module 114 may access the metadata 112 corresponding to the digital work 106 in the manner described above. The dictionary module 114 may use the metadata 112 to select a particular index 1604, such as in an index corresponding to a particular subcategory, a particular foreign language, or the like, as discussed above. In some cases, the dictionary module 114 may access a hierarchy of indices 1604, such as one after another until a suitable definition is found. Thus, the dictionary module 114 may access at least one particular index 1604 and then access corresponding reference information 1606, based on index information obtained from the particular index 1604, to locate context-based definition information 116 for the selected term. The context-based definition information 116 may be transferred from the reference resource computing device 1602 and displayed on the display 118.

Alternatively, in some cases, there may be only a single index 1604, and the index 1604 may itself be categorized or otherwise organized to enable the metadata 112 to be used to identify a particular portion of reference information 1606 to access to obtain the context-based definition information 116. Additionally, in other examples, the indices 1604 and reference information 1606 may be maintained on the electronic device 102, rather than being accessible over the network 108.

In yet other examples, the dictionary module 114 may send at least a portion of the metadata 112 and the selected term to a resource module 1608 executing on the reference resource computing device 1602. For instance, the resource module 1608 may provide an integrated service that generates results based on relevance across the set of digital indices 1604 using the term and the context based on the provided metadata 112. In this implementation, the resource module 1608 may use the received portion of metadata 112 and the selected term to access one or more of the indices 1604, such as according to a hierarchy, to locate the context-based definition information 116. Further, in some cases, the reference information 1606 may be maintained on one or more of computing devices 1602 that are separate from one or more computing devices 1602 maintaining the indices 1604. Other variations will also be apparent to those of skill in the art in view of the disclosure herein.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these terms in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more computer-readable media maintaining instructions executable by one or more processors to perform operations comprising:
    presenting a portion of text of a digital work on a display of an electronic device;
    receiving a selection of a term of one or more words from the text of the digital work;
    accessing, based at least in part on the metadata associated with the digital work, at least one dictionary of a plurality of dictionaries to obtain at least one definition corresponding to the term;
    identifying at least two other occurrences of the term in another digital work maintained on the electronic device;
    determining, based in part on the two other occurrences, two or more groups of similar occurrences of the term; and
    displaying on the display:
        the at least one definition for the term obtained from the at least one dictionary; and
        two or more excerpts of text, each excerpt of text of the two or more excerpts of text including an occurrence of the term from a different group of the two or more groups.

2. The one or more computer-readable media as recited in claim 1, wherein identifying the at least two other occurrences of the term further comprises:
    determining a part of speech to which the term corresponds; and
    searching for the at least two other occurrences of the term in the another digital work maintained on the electronic device, wherein the at least two other occurrences of the term correspond to a same part of speech as the term.

3. The one or more computer-readable media as recited in claim 1, wherein the operations further comprise:
    displaying a first excerpt of text, taken from the digital work, the first excerpt of text including another occurrence of the term in the digital work; and
    selecting the two or more excerpts of text_is based at least in part on a recentness of user access to the another digital work.

4. A method comprising:
    under control of one or more processors configured with executable instructions, receiving a selection of a term of one or more words in a first digital work;
        selecting a dictionary based at least in part on metadata providing information related to content of the digital work;
        identifying two or more occurrences of the term in a second digital work that is different from the first digital work;
        determining, based in part on the two other occurrences, two or more groups of occurrences of the term, a group of the two or more groups including one or more similar occurrences of the term; and
        presenting a definition for the term obtained from the dictionary and two or more excerpts of text, each excerpt of text of the two or more excerpts of text including an occurrence of the term from a different group of the two or more groups.

5. The method as recited in claim 4, wherein the dictionary is one of a plurality of dictionaries, and selecting the dictionary to access further comprises:
    selecting the dictionary to access based at least in part on a hierarchy of the dictionaries.

6. The method as recited in claim 4, further comprising, prior to presenting the definition, comparing at least one candidate definition with text within a threshold distance to the term in the first digital work to determine whether one or more words in the at least one candidate definition match one or more words in the text within the threshold distance to the term.

7. The method as recited in claim 6, further comprising;
    determining that two or more candidate definitions are located; and
    presenting the definition that has a highest probability based, at least in part, on a comparison of words in the definition with words in the text within the threshold distance to the term, wherein the threshold distance is within a threshold number of paragraphs of the term.

8. The method as recited in claim 7, further comprising determining the probability based, at least in part, on crowd-sourced information related to the term.

9. The method as recited in claim 4, further comprising, prior to selecting a dictionary, determining that the term is in a different language from a primary language of the first digital work, wherein selecting the dictionary to access further comprises selecting, from a hierarchy of dictionaries, a language dictionary for the different language.

10. The method as recited in claim 9, further comprising determining that the metadata indicates that the term is in the different language from the primary language of the first digital work.

11. The method as recited in claim 9, further comprising using a language detection algorithm to determine that the term is in a different language from the primary language of the first digital work.

12. The method as recited in claim 4, wherein selecting a dictionary to access further comprises:
    determining from the metadata a language in which the first digital work is written; and
    selecting a dictionary for the language from among a hierarchy of dictionaries, wherein the selecting the dictionary for the language is based, at least in part, on the determining of the language.

13. The method as recited in claim 4, further comprising:
    prior to presenting the definition for the term, determining a part of speech corresponding to the term; and
    presenting the definition for the term based, at least in part on determining that the definition is for a same part of speech.

14. The method as recited in claim 13, further comprising determining that the part of speech is one of: a noun; a verb; an adjective; or an adverb.

15. The method as recited in claim 4, wherein presenting the definition for the term further comprises:
    presenting multiple definitions for the term;
    detecting a user selection of the definition from the multiple definitions; and
    sending a definition selection result to a computing device over a network for aggregation with other user selections for the term.

16. The method as recited in claim 15, wherein detecting the user selection of the definition further comprises receiving the user selection via an input action.

17. A device comprising:
    one or more processors;
    one or more computer-readable media; and one or more modules maintained on the one or more computer-readable media to be executed by the one or more processors to perform operations including:
  detecting a selection of a term in displayed text of a first digital work;
  determining a first group of occurrences of the term and a second group of occurrences of the term, at least one of the first group or the second group including one or more similar occurrences of the term;
  identifying a first occurrence of the term from the first group of occurrences and a second occurrence of the term from the second group of occurrences, wherein at least one of the first occurrence of the term or the second occurrence of the term is located within a second digital work;
  displaying a first excerpt of text that includes the first occurrence of the term and a second excerpt of text that includes the second occurrence of the term; and
  displaying, based at least in part on crowd-sourced descriptive text, a definition of the term.

18. The device as recited in claim 17, the method further comprising ranking the first occurrence of the term, the second occurrence of the term, and one or more other occurrences of the term based, at least in part, on at least one of:
  whether a different occurrence of the term corresponds to a same part of speech as the term;
  whether an excerpt containing the first occurrence of the term is from the first digital work;
  whether an excerpt containing the first occurrence of the term is from the second digital work in a same category as the first digital work having the term;
  a commonality of time periods between the first digital work having the term and the second digital work that is a source of the different occurrence of the term;
  a recentness of user access to the second digital work including the different occurrence of the term; or
  a comparison of words in text within a threshold distance to the term with words within the threshold distance to the different occurrence of the term; and further comprising:
  selecting the first excerpt of text for display based at least in part on the ranking.

19. The device as recited in claim 17, further comprising:
  selecting, from a plurality of dictionaries, a dictionary to access based at least in part on metadata associated with the first digital work; and
  displaying an interface that includes a definition for the term obtained from the dictionary, the first excerpt of text, and the second excerpt of text.

20. One or more computer-readable media maintaining instructions executable by one or more processors to perform operations comprising:
  selecting, from a hierarchy of indices, an index to access based at least in part on metadata related to content of a digital work;
  searching the index for a term selected from the digital work;
  accessing resource information, based at least in part on a result of searching the index, to obtain context-based definition information corresponding to the term;
  determining a first group of occurrences of the term and a second group of occurrences of the term, at least one of the first group or the second group including one or more similar occurrences of the term; and
  based in part on the resource information, displaying:
    a first excerpt of text containing a first occurrence of the term from the first group, and
    a second excerpt of text containing a second occurrence of the term from the second group.

21. The one or more computer-readable media as recited in claim 20, wherein selecting an index further comprises selecting the index from among the hierarchy of indices based at least in part on at least one of:
  a category to which the index corresponds; or
  a foreign language to which the index corresponds.

22. The one or more computer-readable media as recited in claim 20, wherein the operations further comprise transferring the context-based definition information over a network.

23. The one or more computer-readable media as recited in claim 20, wherein the operations further comprise receiving the metadata and the term over a network.

24. The one or more computer-readable media as recited in claim 1, wherein the determining the hierarchy of the plurality of dictionaries comprises determining at least one of a category or a subcategory of the digital work.

25. The one or more computer-readable media as recited in claim 1, wherein the operations further comprise determining that the digital work is a digital audio work or a digital video work.

26. The one or more computer-readable media as recited in claim 25, wherein the operations further comprise determining that at least one of the digital audio work or the digital video work comprises an associated text.

27. The one or more computer-readable media as recited in claim 1, wherein the identifying comprises;
  accessing a first index contained in the metadata associated with the digital work, and
  accessing a second index contained in the metadata associated with the another digital work.

28. The one or more computer-readable media as recited in claim 17, wherein the operations further comprise selecting the second digital work based at least in part on metadata associated with the second digital work.

29. The one or more computer-readable media as recited in claim 1, wherein the operations further comprise determining that the metadata associated with the digital work specifies at least one of a dialect, a convention, or a vernacular associated with the digital work.

30. The method as recited in claim 4, further comprising:
  ranking one or more similar occurrences of the term in a first group of the two or more groups to generate ranked one or more similar occurrences based at least in part upon metadata associated with the second digital work; and
  selecting an occurrence of the term of the one or more similar occurrences of the term based at least in part on the ranked one or more similar occurrences; and
  wherein at least one of the two or more excerpts of text contain the occurrence of the term of the one or more similar occurrences of the term.

31. The one or more computer-readable media as recited in claim 1, wherein the operations further comprise:
  presenting a user interface configured to receive a selection of one or more digital works;
  determining a context-based definition of the term based at least in part on the selection; and
  wherein accessing the at least one dictionary is further based on the one or more digital works.

* * * * *